US009853477B2

(12) United States Patent
Zhai

(10) Patent No.: US 9,853,477 B2
(45) Date of Patent: Dec. 26, 2017

(54) SYSTEMS AND METHODS OF ADAPTIVE BATTERY CHARGING

(71) Applicant: Jerry Zhijun Zhai, Toronto (CA)

(72) Inventor: Jerry Zhijun Zhai, Toronto (CA)

(73) Assignee: GRENOTEK INTEGRATED, INC., Waltham, MA (US)

( * ) Notice: Subject to any disclaimer, the term of this patent is extended or adjusted under 35 U.S.C. 154(b) by 281 days.

(21) Appl. No.: 14/534,439

(22) Filed: Nov. 6, 2014

(65) Prior Publication Data
US 2015/0130419 A1    May 14, 2015

Related U.S. Application Data

(60) Provisional application No. 61/902,938, filed on Nov. 12, 2013, provisional application No. 61/908,313, filed on Nov. 25, 2013.

(51) Int. Cl.
H02J 7/00 (2006.01)
H02J 7/04 (2006.01)

(52) U.S. Cl.
CPC ............ H02J 7/0073 (2013.01); H02J 7/007 (2013.01); H02J 7/041 (2013.01)

(58) Field of Classification Search
CPC .......... H02J 7/0073; H02J 7/007; H02J 7/041
See application file for complete search history.

(56) References Cited

U.S. PATENT DOCUMENTS

| 3,901,729 | A | * | 8/1975 | Duddy | H01M 6/5005 320/147 |
|---|---|---|---|---|---|
| 5,670,863 | A | * | 9/1997 | Broell | H02J 7/0073 320/145 |
| 6,025,696 | A | * | 2/2000 | Lenhart | H02H 7/18 320/122 |
| 6,208,117 | B1 | * | 3/2001 | Hibi | H02J 7/0021 320/134 |
| 7,595,608 | B2 | * | 9/2009 | Gangstoe | H02J 7/0031 320/128 |
| 7,830,115 | B2 | * | 11/2010 | Wong | H01M 10/44 320/108 |
| 7,834,591 | B2 | * | 11/2010 | Hussain | H01M 10/44 320/128 |

(Continued)

Primary Examiner — Naum B Levin
(74) Attorney, Agent, or Firm — BainwoodHuang

(57) ABSTRACT

Systems and methods of charging battery power that can be selectively controlled by the overall voltage of a battery pack and specified voltages of battery cells within the battery pack, and that can selectively perform current-controlled and voltage-controlled battery charging (referred to herein as "adaptive battery cell charging"). The systems and methods employ a digital core for managing the charging of battery power provided by the battery pack. By using the overall voltage of the battery pack and specified voltages of battery cells to selectively control the charging of battery power, battery charging times can be reduced. By employing current/voltage sense amplifiers to monitor the battery pack voltage, the battery cell voltage(s), and a battery charging current, the effect of cable resistance to/from the battery pack can be reduced. By performing adaptive battery cell charging, battery charging times and battery stress can be reduced, while increasing battery charge/discharge life cycles.

15 Claims, 15 Drawing Sheets

(56) References Cited

U.S. PATENT DOCUMENTS

| | | | | |
|---|---|---|---|---|
| 8,129,995 B2* | 3/2012 | Kang | ................... | G01R 15/16 |
| | | | | 320/132 |
| 8,933,666 B2* | 1/2015 | Schwartz | .............. | H02J 7/0016 |
| | | | | 320/125 |
| 9,018,921 B2* | 4/2015 | Gurlahosur | ........... | H02J 7/0081 |
| | | | | 320/134 |
| 2013/0002199 A1* | 1/2013 | Hu | ....................... | H02J 7/0004 |
| | | | | 320/112 |
| 2013/0020998 A1* | 1/2013 | Howard | ............... | H02J 7/0026 |
| | | | | 320/117 |
| 2013/0229156 A1* | 9/2013 | Brandon | .............. | B60L 3/0046 |
| | | | | 320/136 |
| 2015/0311730 A1* | 10/2015 | Aradachi | ............. | H02J 7/0006 |
| | | | | 320/134 |

* cited by examiner

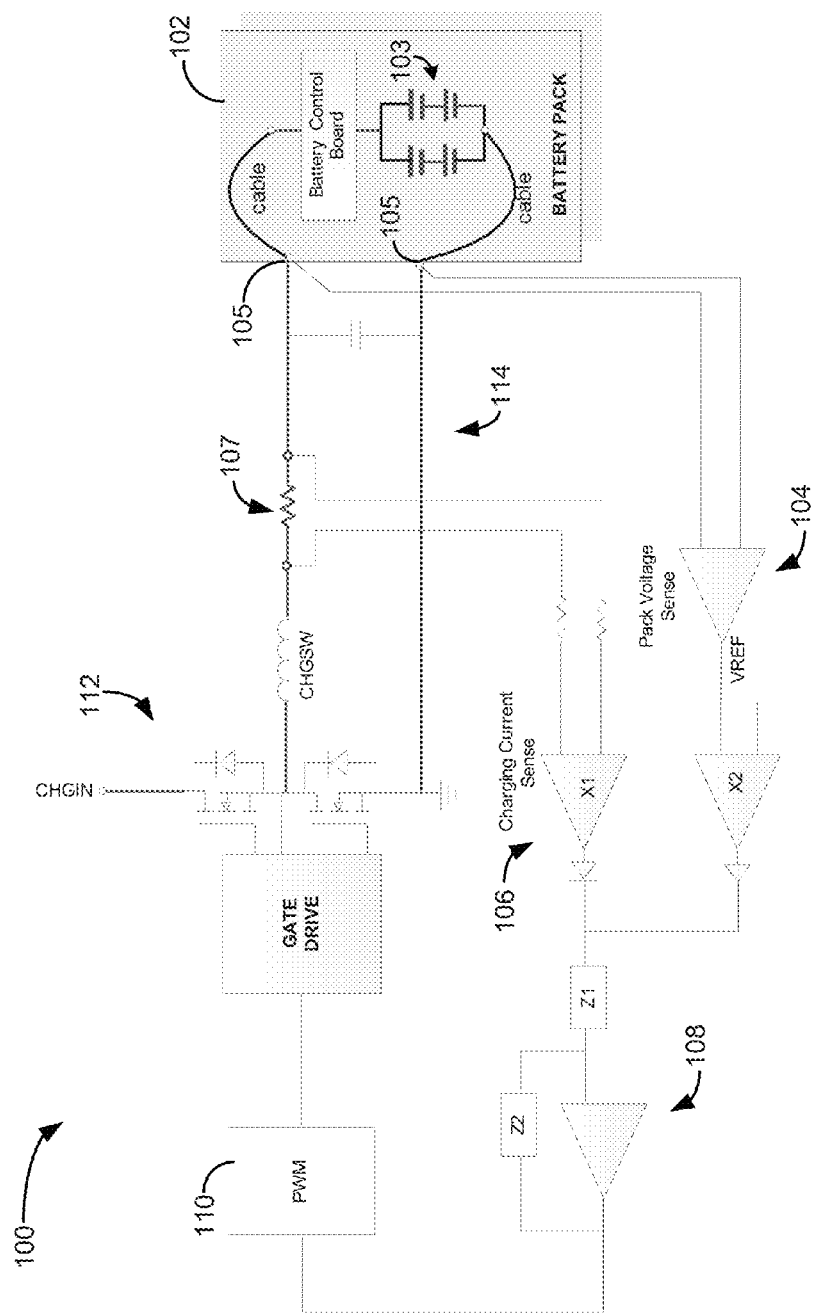
FIG. 1 – Prior art

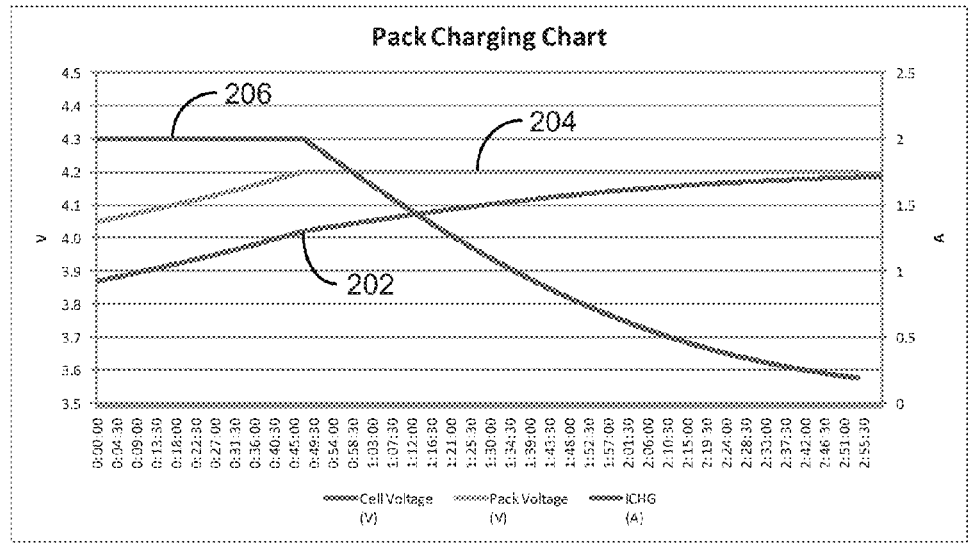
*FIG. 2 – Prior art*
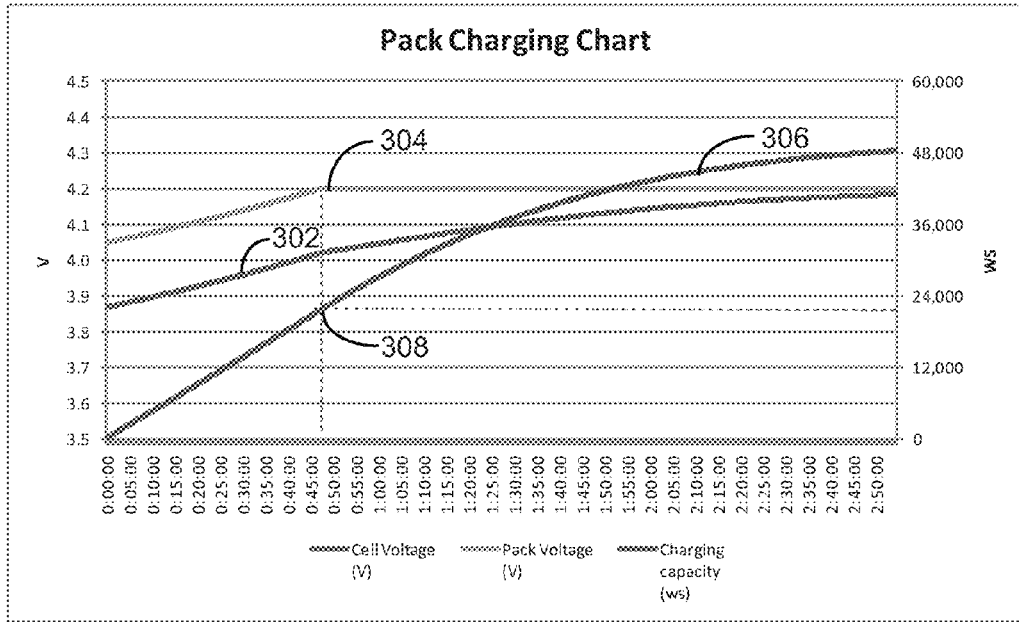
*FIG. 3 – Prior art*

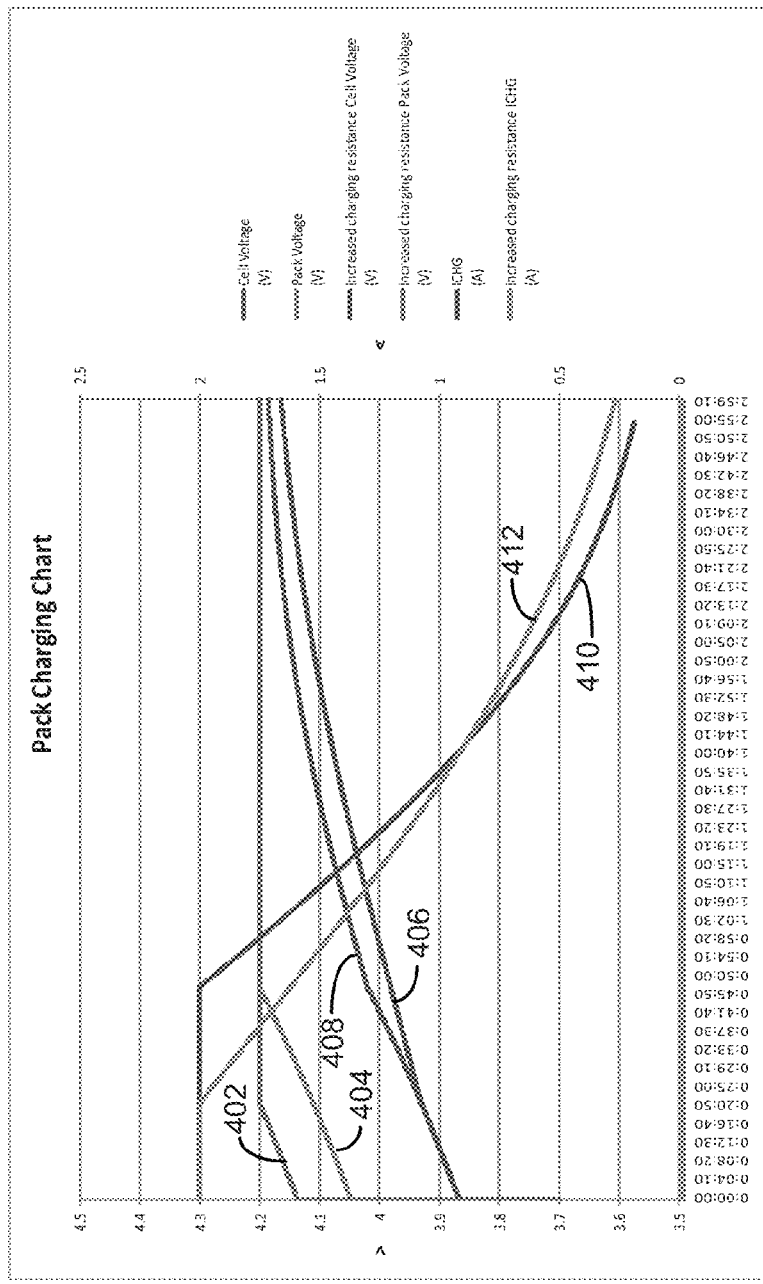
FIG. 4 – Prior art

SYSTEMS AND METHODS OF ADAPTIVE BATTERY CHARGING

CROSS REFERENCE TO RELATED APPLICATIONS

This application claims benefit of the priority of U.S. Provisional Patent Application No. 61/902,938 filed Nov. 12, 2013 entitled BATTERY CHARGING SYSTEMS AND METHODS, and U.S. Provisional Patent Application No. 61/908,313 filed Nov. 25, 2013 entitled SYSTEMS AND METHODS OF ADAPTIVE BATTERY CHARGING.

TECHNICAL FIELD

The present application relates generally to systems and methods of charging battery power in computers, computerized devices, tablet computers, smartphones, medical devices, industrial devices, or any other suitable battery-powered devices, and more specifically to systems and methods of charging battery power that can be selectively controlled by the overall voltage of a battery pack, as well as by specified voltages of one or more battery cells within the battery pack. This application further relates to systems and methods of charging battery power that can selectively perform current-controlled battery charging and voltage-controlled battery charging to reduce battery charging times and battery stress, while increasing battery charge/discharge life cycles.

BACKGROUND

A conventional battery charging system for charging battery power provided by a battery pack typically includes a voltage sense circuit, a current sense circuit, a loop filter, a pulse width modulation (PWM) circuit, and gate drive circuitry. The voltage sense circuit monitors the overall voltage provided by the battery pack, and the current sense circuit monitors a battery charging current across a current sense resistor. The voltage and current sense circuits provide an error deviation signal to the loop filter, which provides a filtered control signal to the PWM circuit. Using the filtered control signal, the PWM circuit generates PWM pulses for controlling the gate drive circuitry, thereby providing the battery charging current to the battery pack over a charging path.

The conventional battery charging system described herein has several drawbacks. For example, the voltage sense circuit typically monitors the overall voltage provided by the battery pack across terminals of the battery pack, where there can be a significant voltage drop. Such a voltage drop across the battery pack terminals not only can reduce the battery charging speed, but also can reduce the battery capacity. Further, during battery charging, a battery cell voltage can fail to reach a target level of the battery pack voltage. Because the capacity of the battery pack to store energy is generally dependent upon the battery cell voltage, the failure of the battery cell voltage to reach the target voltage level can further reduce the battery capacity. In addition, the charging path can have high impedance due to, e.g., the resistance of copper connections on a printed circuit board (PCB), connectors, switches, cables, etc. Such a high impedance of the charging path can reduce a fast charging period of battery charging, during which constant current charging is performed. Moreover, as temperatures rise, the resistance of the various elements in the charging path can increase, making the impedance of the charging path even higher, which can further reduce the battery charging speed, as well as the battery capacity.

It would therefore be desirable to have improved systems and methods of charging battery power that avoid at least some of the drawbacks of conventional battery charging systems.

SUMMARY

In accordance with the present application, systems and methods of charging battery power are disclosed that can be selectively controlled by the overall voltage of a battery pack, as well as by specified voltages of one or more battery cells within the battery pack. Such systems and methods employ a digital core (also referred to herein as the "digital management core") for managing the charging of battery power provided by the battery pack. The digital management core can monitor a battery charging current using a current sense amplifier, monitor the battery pack voltage and the battery cell voltage(s) using a plurality of voltage sense amplifiers, and make decisions for charging the battery pack to one or more target voltages based at least on the monitored battery charging current and/or the monitored battery pack and/or battery cell voltages.

In one aspect, the disclosed systems and methods of charging battery power employ the digital management core to set a predetermined target current level for the battery charging current, and employ a feedback loop to monitor an error deviation in the battery charging current from the predetermined target current level. Such systems and methods further employ the digital management core to set predetermined target voltage levels for the respective battery pack and cell voltages, and employ feedback loops to monitor error deviations in the respective battery pack and cell voltages from the predetermined target voltage levels. Using the error deviation in the battery charging current and/or the error deviations in the respective battery pack and/or battery cell voltages, the disclosed systems and methods for charging battery power can generate a control signal for controlling the generation of a charging signal (e.g., a pulse width modulation (PWM) signal) that operates to minimize the respective error deviations in the battery charging current, the battery pack voltage, and/or the battery cell voltage(s).

By selectively using the overall voltage of a battery pack, as well as specified voltages of one or more battery cells within the battery pack, to control the charging of battery power, the disclosed systems and methods for charging battery power can advantageously reduce battery charging times. Moreover, by employing current and voltage sense amplifiers to monitor, as appropriate, the battery charging current, the battery pack voltage, and the battery cell voltage(s), such systems and methods can advantageously reduce the effects of cable resistance to/from the battery pack.

In further accordance with the present application, systems and methods of charging battery power are disclosed that can selectively perform current-controlled battery charging and voltage-controlled battery charging (such selective current and voltage-controlled battery charging referred to herein as "adaptive battery cell charging") to reduce battery charging times and battery stress, while increasing battery charge/discharge life cycles. Such systems and methods can perform adaptive battery cell charging by adaptively controlling the level of a battery charging current based at least on the voltage level of a battery pack and/or the voltage level of at least one selected battery cell within the battery pack, as well as by adaptively controlling the level of a battery charging voltage based at least on the level of the battery charging current.

In one aspect, like the disclosed systems and methods of charging battery power, the disclosed systems and methods of performing adaptive battery cell charging employ a digital management core for managing the charging of battery power provided by the battery pack. The digital management core can monitor the battery charging current and an alternating current (AC) adapter current using a plurality of current sense amplifiers, monitor the battery pack voltage, the battery cell voltage(s), and an AC adapter voltage using a plurality of voltage sense amplifiers, and make decisions for adaptively controlling the levels of the battery charging current and/or the battery charging voltage based at least on the monitored battery charging current and/or AC adapter current, and/or the monitored battery pack voltage and/or battery cell voltage(s).

In one mode of operation, such systems and methods can perform adaptive battery cell charging in two time intervals, namely, a first time interval during which current-controlled battery charging is performed, and a second time interval during which voltage-controlled battery charging is performed. In the first time interval of adaptive battery cell charging, the digital management core monitors a plurality of specified voltage points or levels of the battery pack or cell voltage, and, at each increasing voltage point or level of the monitored battery pack or cell voltage, reduces the battery charging current by a predetermined amount until the battery pack or cell voltage reaches a specified voltage saturation level ($V_{SAT}$).

Once the battery pack or cell voltage reaches the specified voltage saturation level $V_{SAT}$, the second time interval of adaptive battery cell charging begins, during which the digital management core monitors the decreasing battery charging current until it is less than a specified current saturation level ($I_{SAT}$). While the battery charging current is less than the specified current saturation level $I_{SAT}$ but greater than a current cutoff level ($I_{CUTOFF}$), the digital management core reduces the battery charging voltage (i.e., the battery float voltage) of the battery pack or cell to a specified level to perform deep saturation charging until the charging of battery power provided by the battery pack is completed. By performing adaptive battery cell charging, such systems and methods can advantageously reduce battery charging times and battery stress, while increasing battery charge/discharge life cycles.

Other features, functions, and aspects of the invention will be evident from the Detailed Description that follows.

BRIEF DESCRIPTION OF THE DRAWINGS

The accompanying drawings, which are incorporated in and constitute a part of this specification, illustrate one or more embodiments described herein, and, together with the Detailed Description, explain these embodiments. In the drawings:

FIG. 1 is a schematic diagram of a conventional battery charging system;

FIG. 2 is a diagram illustrating typical battery pack charging times obtained using the conventional battery charging system of FIG. 1;

FIG. 3 is a diagram illustrating a typical battery pack charging capacity obtained using the conventional battery charging system of FIG. 1;

FIG. 4 is a diagram illustrating a comparison of typical battery cell charging and typical battery pack charging when a charging path resistance is increased, using the conventional battery charging system of FIG. 1;

FIG. 5b is a schematic diagram of the battery charging system of FIG. 5a;

FIG. 10b is a schematic diagram of the adaptive battery cell charging system of FIG. 10a;

DETAILED DESCRIPTION

Figure 5A:
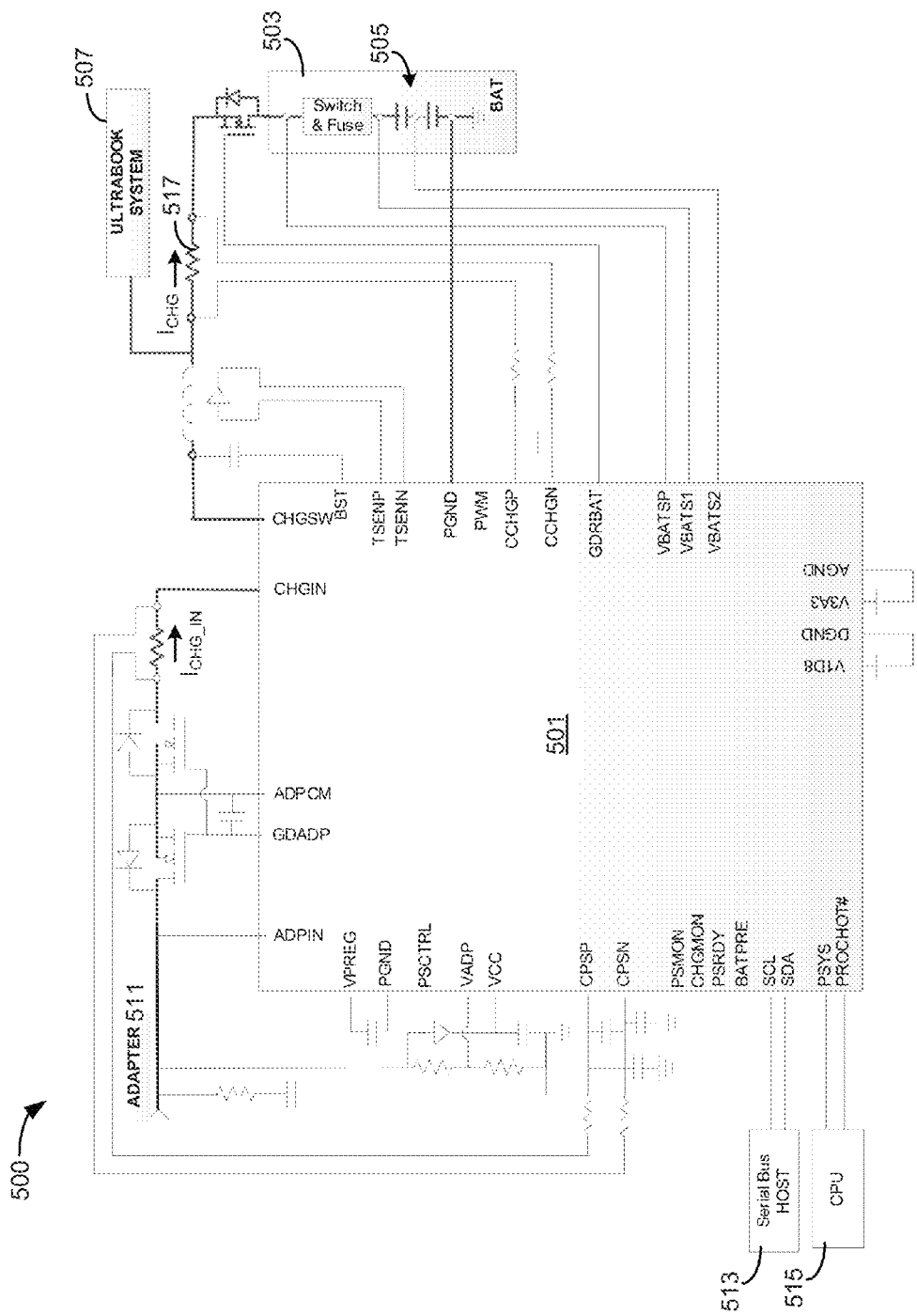
FIG. 5a is a schematic diagram of an exemplary target configuration of an exemplary battery charging system, in accordance with the present application.

U.S. Provisional Patent Application No. 61/902,938 filed Nov. 12, 2013 entitled BATTERY CHARGING SYSTEMS AND METHODS, and U.S. Provisional Patent Application No. 61/908,313 filed Nov. 25, 2013 entitled SYSTEMS AND METHODS OF ADAPTIVE BATTERY CHARGING, are hereby incorporated herein by reference in their entirety.

Systems and methods of charging battery power are disclosed that can be selectively controlled by the overall voltage of a battery pack, as well as by specified voltages of one or more battery cells within the battery pack. Such systems and methods employ a digital core for managing the charging of battery power provided by the battery pack. By using the overall voltage of the battery pack and/or specified voltages of one or more of the battery cells within the battery pack to selectively control the charging of battery power, the disclosed systems and methods of charging battery power can advantageously reduce battery charging times. In addition, by employing current and voltage sense amplifiers to monitor, as appropriate, the battery pack voltage, the battery cell voltage(s), and a battery charging current, the disclosed systems and methods of charging battery power can advantageously reduce the effect of cable resistance to/from the battery pack.

FIG. 1 depicts a conventional battery charging system 100 for charging battery power provided by a battery pack 102, which includes a plurality of battery cells 103. As shown in FIG. 1, the conventional battery charging system 100 includes a voltage sense circuit 104, a current sense circuit 106, a loop filter 108, a pulse width modulation (PWM) circuit 110, and gate drive circuitry 112. The voltage sense circuit 104 is operative to sense or monitor the overall voltage provided by the battery pack 102, and the current sense circuit 106 is operative to sense or monitor a battery charging current across a current sense resistor 107. The voltage and current sense circuits 104, 106 provide an error deviation signal to the loop filter 108, which provides a filtered control signal to the PWM circuit 110. Using the filtered control signal, the PWM circuit 110 generates PWM pulses for controlling the gate drive circuitry 112, thereby providing the battery charging current to the battery pack 102 over a charging path 114.

FIG. 2 depicts typical battery pack charging times that can be obtained using the conventional battery charging system 100 (see FIG. 1). Specifically, FIG. 2 depicts the battery charging current (see reference numeral 206), the battery pack voltage (see reference numeral 204), and a battery cell voltage (see reference numeral 202), over an exemplary time period ranging, e.g., from 0:00:00 to 2:55:30. As shown in FIG. 2, at the end of the exemplary time period (i.e., 2:55:30), the battery cell voltage 202 has not reached a target level of the battery pack voltage 204, i.e., 4.2 volts.

FIG. 3 depicts a typical battery pack charging capacity that can be obtained using the conventional battery charging system 100 (see FIG. 1). Specifically, FIG. 3 depicts the battery pack charging capacity (see reference numeral 306), the battery pack voltage (see reference numeral 304), and the battery cell voltage (see reference numeral 302), over an exemplary time period ranging, e.g., from 0:00:00 to 2:50:00. For the typical charging times of FIG. 2, and the typical battery pack charging capacity of FIG. 3, it is assumed that the charging path 114 (see FIG. 1) has a resistance of about 90 mΩ. It is noted that reference numeral 308 indicates the end of the "fast charging" period of battery charging (at about time 0:45:00), during which constant current charging is performed.

FIG. 4 depicts a comparison of typical battery cell charging and battery pack charging when the resistance of the charging path 114 (see FIG. 1) is increased from about 90 mΩ to about 135 mΩ, using the conventional battery charging system 100 (see FIG. 1). Specifically, over an exemplary time period ranging, e.g., from 0:00:00 to 2:59:10, FIG. 4 depicts the battery charging current (see reference numeral 410), the battery pack voltage (see reference numeral 404), and the battery cell voltage (see reference numeral 408), when the resistance of the charging path 114 is equal to about 90 mΩ. FIG. 4 further depicts the battery charging current (see reference numeral 412), the battery pack voltage (see reference numeral 402), and the battery cell voltage (see reference numeral 406), when the resistance of the charging path 114 is increased to about 135 mΩ. As shown in FIG. 4, at the end of the exemplary time period (i.e., 2:59:10), the battery cell voltage 406 has not reached the battery pack voltage 402, which, in turn, has not reached the target voltage level of 4.2 volts.

The conventional battery charging system 100 of FIG. 1 has several drawbacks. For example, the voltage sense circuit 104 typically monitors the overall voltage provided by the battery pack 102 across battery pack terminals 105, where there can be a significant voltage drop. Such a voltage drop across the terminals 105 not only reduces the battery charging speed, but also reduces the battery capacity. Further, as discussed above, during battery charging, the battery cell voltage (e.g., reference numeral 202) can fail to reach the target level (e.g., 4.2 volts) of the battery pack voltage (e.g., reference numeral 204). Because the capacity of the battery pack 102 to store energy is generally dependent upon the battery cell voltage, the failure of the battery cell voltage 202 to reach the target voltage level of 4.2 volts can further reduce the battery capacity. For example, when the battery cell voltage 202 is reduced, e.g., from 4.2 volts to about 4.1 volts, the battery capacity can be reduced by about 10-15%, depending on the chemical characteristics of the battery cell. In addition, the charging path 114 can have high impedance due to, e.g., the resistance of copper connections on a printed circuit board (PCB), connectors, switches, cables, etc. Such high impedance of the charging path 114 can reduce the fast charging period of battery charging, during which constant current charging is performed. Moreover, as temperatures rise, the resistance of the various elements in the charging path 114 can increase, making the impedance of the charging path 114 even higher, which can further reduce the battery charging speed, as well as the battery capacity.

FIG. 5a depicts an exemplary target configuration 500 of an exemplary battery charging system 501, in accordance with the present application. As shown in FIG. 5a, the target configuration 500 includes the battery charging system 501 operatively coupled to an alternating current (AC) adapter port 511, a computer such as an Ultrabook® computer system 507, and a battery pack 503, as well as a serial bus host 513 and a central processing unit (CPU) 515. The battery pack 503 includes a plurality of battery cells 505. An AC adapter (not shown) connectable to the AC adapter port 511 converts AC power to a predetermined DC power (e.g., 12 $V_{DC}$) for generating an initial battery charging current, $I_{CHG\_IN}$, which, having been applied to a power stage 516 (see FIG. 5b) within the battery charging system 501, is used to generate a battery charging current, $I_{CHG}$, for charging the battery pack 503. It is noted that such DC power for generating the battery charging current can be provided by an AC power adapter, a universal serial bus (USB) power adapter, or any other suitable power adapter or power source.

Figure 5B:
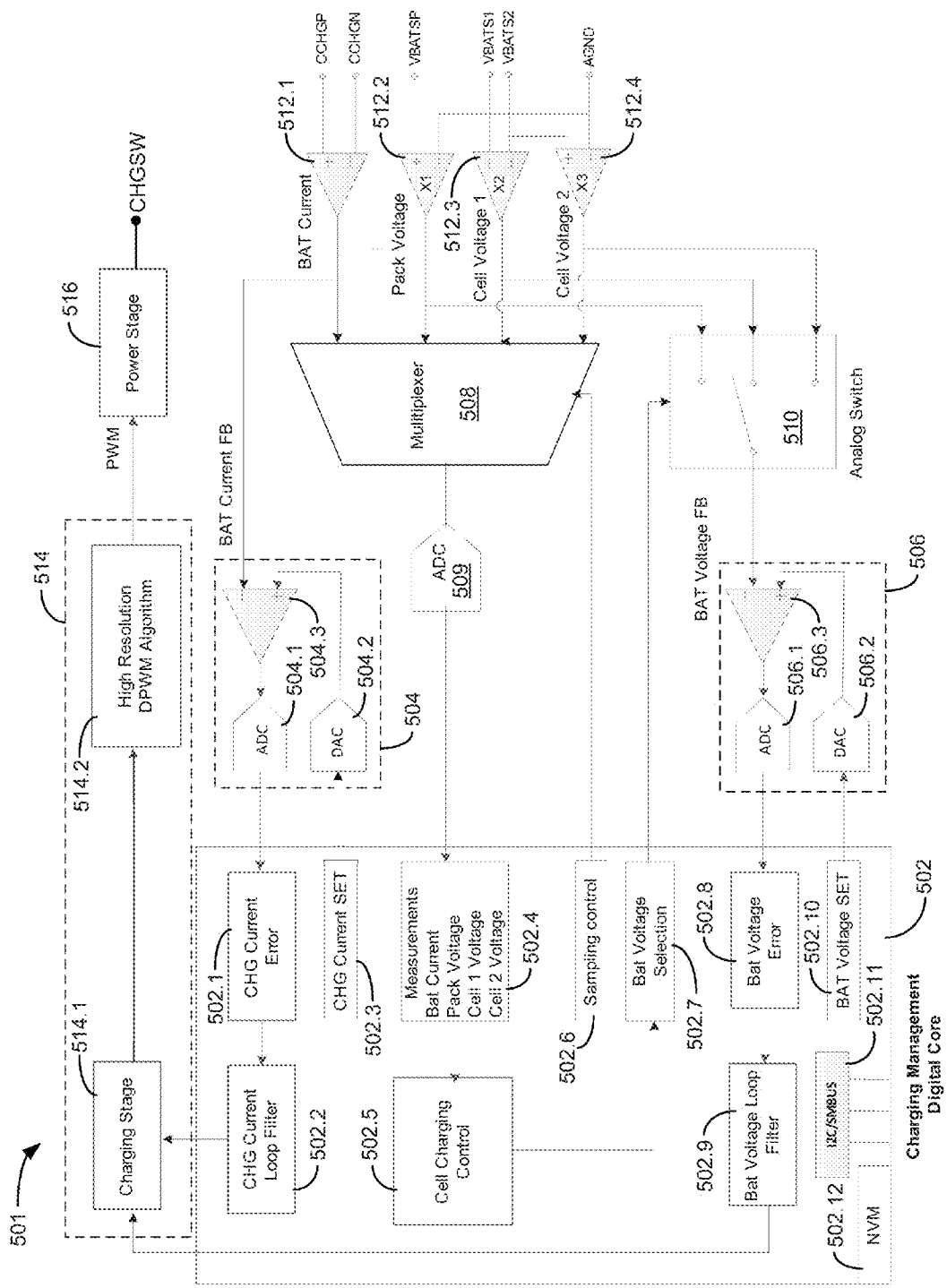

FIG. 5b depicts an illustrative embodiment of the battery charging system 501. As shown in FIG. 5b, the battery charging system 501 includes a digital management core 502, a current loop error detection circuit 504, a voltage loop error detection circuit 506, a multiplexer 508, an analog switch 510, a plurality of current/voltage sense amplifiers 512.1-512.4, a charging signal generation module 514, and the power stage 516 for providing the battery charging current, $I_{CHG}$. The digital management core 502 includes a plurality of functional components, including a battery charge (such a battery charge also referred to herein as "CHG") current error component 502.1, a CHG current loop filter component 502.2, a CHG current set component 502.3, a measurement component 502.4, a cell charging control component 502.5, a sampling control component 502.6, a battery (Bat) voltage selection component 502.7, a battery voltage error component 502.8, a battery voltage loop filter component 502.9, a battery voltage set component 502.10, a serial communications (e.g., I2C/SMBUS) component 502.11, and a non-volatile memory (NVM) component 502.12. For example, the battery charging system 501 may be employed to charge battery power provided by a battery pack (e.g., the battery pack 503; see FIG. 5a) that includes one battery cell, two series-connected battery cells, three series-connected battery cells, four series-connected battery cells, or any other suitable number of battery cells in any other suitable series-connected and/or parallel-connected battery cell configuration.

In an exemplary mode of operation, the current sense amplifier 512.1 senses or monitors a level of the battery charging current ($I_{CHG}$) across a current sense resistor 517 (see FIG. 5a) between nodes CCHGP, CCHGN, the voltage sense amplifier 512.2 senses or monitors a level of the battery pack voltage at a battery node VBATSP, the voltage sense amplifier 512.3 senses or monitors a level of a first battery cell voltage at a battery node VBATS1, and the voltage sense amplifier 512.4 senses or monitors a level of a second battery cell voltage at a battery node VBATS2. The current/voltage sense amplifiers 512.1-512.4 provide analog voltages proportional to the monitored levels of battery charging current (BAT Current), battery pack voltage (Pack Voltage), and first and second battery cell voltages (Cell Voltage 1, Cell Voltage 2), respectively, to the multiplexer 508. The sampling control component 502.6 provides at least one select signal to the multiplexer 508 for selecting at least one of the respective analog voltages (BAT Current, Pack Voltage, Cell Voltage 1, Cell Voltage 2). The multiplexer 508 provides the selected analog voltage(s) to an analog-to-digital converter (ADC) 509, which converts the selected analog voltage(s) to digital form, and provides the selected voltage(s) in digital form to the measurement component 502.4. Upon start-up of the charging of battery power, the ADC 509 can convert the respective analog voltages (BAT Current, Pack Voltage, Cell Voltage 1, Cell Voltage 2) to digital form, and store them in registers within the measurement component 502.4.

Having received the selected voltage(s) (BAT Current, Pack Voltage, Cell Voltage 1, Cell Voltage 2) in digital form from the ADC 509, the measurement component 502.4 measures the selected voltage(s), and provides resulting voltage measurement(s) to the cell charging control component 502.5. Based at least on the voltage measurement(s), the cell charging control component 502.5 instructs the Bat voltage selection component 502.7 to select, via the analog switch 510, the Pack Voltage, the Cell Voltage 1, or the Cell Voltage 2, to control the charging of battery power provided by the battery pack for a predetermined period of battery charging. The selected Pack Voltage, Cell Voltage 1, or Cell Voltage 2 is provided, via the analog switch 510, to the voltage loop error detection circuit 506, which includes an ADC 506.1, a digital-to-analog converter (DAC) 506.2, and a comparator 506.3. The Bat voltage set component 502.10 provides a specified target voltage level, in digital form, for the selected Pack Voltage, Cell Voltage 1, or Cell Voltage 2 to the DAC 506.2, which converts the target voltage level to analog form, and provides the target voltage level in analog form to the comparator 506.3. The comparator 506.3 compares the selected Pack Voltage, Cell Voltage 1, or Cell Voltage 2 to the target voltage level, and, based at least on the comparison, provides an analog voltage proportional to a voltage error deviation to the ADC 506.1. The ADC 506.1 provides a digital signal representative of the voltage error deviation to the Bat voltage error component 502.8, which, in turn, provides a voltage error deviation signal to the Bat voltage loop filter component 502.9.

The BAT Current is provided to the current loop error detection circuit 504, which includes an ADC 504.1, a DAC 504.2, and a comparator 504.3. The CHG current set component 502.3 provides a digital output proportional to a specified target current level for the BAT Current to the DAC 504.2, which converts the target current level to analog form, and provides the target current level in analog form to the comparator 504.3. The comparator 504.3 compares the BAT Current to the target current level, and, based at least on the comparison, provides an analog voltage proportional to a current error deviation to the ADC 504.1. The ADC 504.1 provides a digital signal representative of the current error deviation to the CHG current error component 502.1, which, in turn, provides a current error deviation signal to the CHG current loop filter component 502.2.

Having received the voltage error deviation signal and the current error deviation signal from the Bat voltage error component 502.8 and the CHG current error component 502.1, respectively, the Bat voltage loop filter component 502.9 and the CHG current loop filter component 502.2 provide the respective voltage and current error deviation signals to the charging signal generation module 514, which can include a charging stage 514.1, as well as a component 514.2 for implementing a high resolution digital PWM (DPWM) algorithm, or any other suitable PWM algorithm. Using the voltage and current error deviation signals, the charging signal generation module 514 generates a control signal for controlling the generation of a charging signal (e.g., a DPWM or PWM signal) that operates to minimize the respective voltage and current error deviation signals. The charging signal generation module 514 provides the charging signal to the power stage 516, which uses the charging signal to generate or provide the battery charging current, $I_{CHG}$.

With reference to the battery charging system 501 of FIGS. 5a-5b, it is noted that the current sense amplifier 512.1 can sense, detect, or monitor the level of the battery charging current ($I_{CHG}$) at the nodes CCHGP, CCHGN during the charging of battery power, as well as the discharging of battery power. Further, in one embodiment, the voltage sense amplifier 512.2 can sense, detect, or monitor the level of the battery pack voltage at the battery node VBATSP, and scale down its voltage output to the equivalent voltage for a single battery cell. Moreover, the ADC 509 can have a higher resolution and accuracy than the ADCs 504.1, 506.1 to allow more accurate control of the charging of battery power.

In addition, in one embodiment, the cell charging control component 502.5 can instruct the Bat voltage selection component 502.7 to select, via the analog switch 510, the Pack Voltage, the Cell Voltage 1, the Cell Voltage 2, or the maximum voltage among the Pack Voltage and Cell Voltages 1, 2, to control the charging of battery power. It is noted that, during the charging of battery power, the selected voltage for controlling the charging can be changed. For example, one of the Cell Voltages 1, 2 may be lower at the beginning of the charging of battery power, but may increase faster than the other cell voltage as the charging progresses. When the increasing cell voltage exceeds the maximum voltage together with the hystersistic voltage, the Bat voltage selection component 502.7 can be instructed to select that increased cell voltage to control the charging of battery power.

Still further, because the CHG current set component 502.3, the BAT voltage set component 502.10, the current loop control (e.g., CHG current error component 502.1), and the voltage loop control (e.g., Bat voltage error component 502.8) are in the digital domain, the loop gain can be optimized to provide good linear and/or nonlinear control. For example, nonlinear control can be implemented to achieve a fast transient in the loop response when the current consumption of the system power operates in a dynamic state. Moreover, the CHG current set component 502.3 can be optimized and adjusted in real-time, in accordance with the battery status, voltage source current capability, and system power consumption. Because the control of the charging of battery power is in the digital domain, such control is less affected by noise in the PCB layout and/or PCB components, and can therefore be employed in computers and computerized devices with embedded batteries or battery packs.

In addition, using the battery charging system 501 (see FIGS. 5a-5b), the charging of battery power is faster than conventional approaches, and is less affected by resistance from battery cables, switches, etc. Further, because the Pack Voltage, the Cell Voltage 1, and the Cell Voltage 2 are substantially independent of the cable resistance, the voltage error deviation is reduced during charging, thereby resulting in increased battery capacity.

Figure 6:
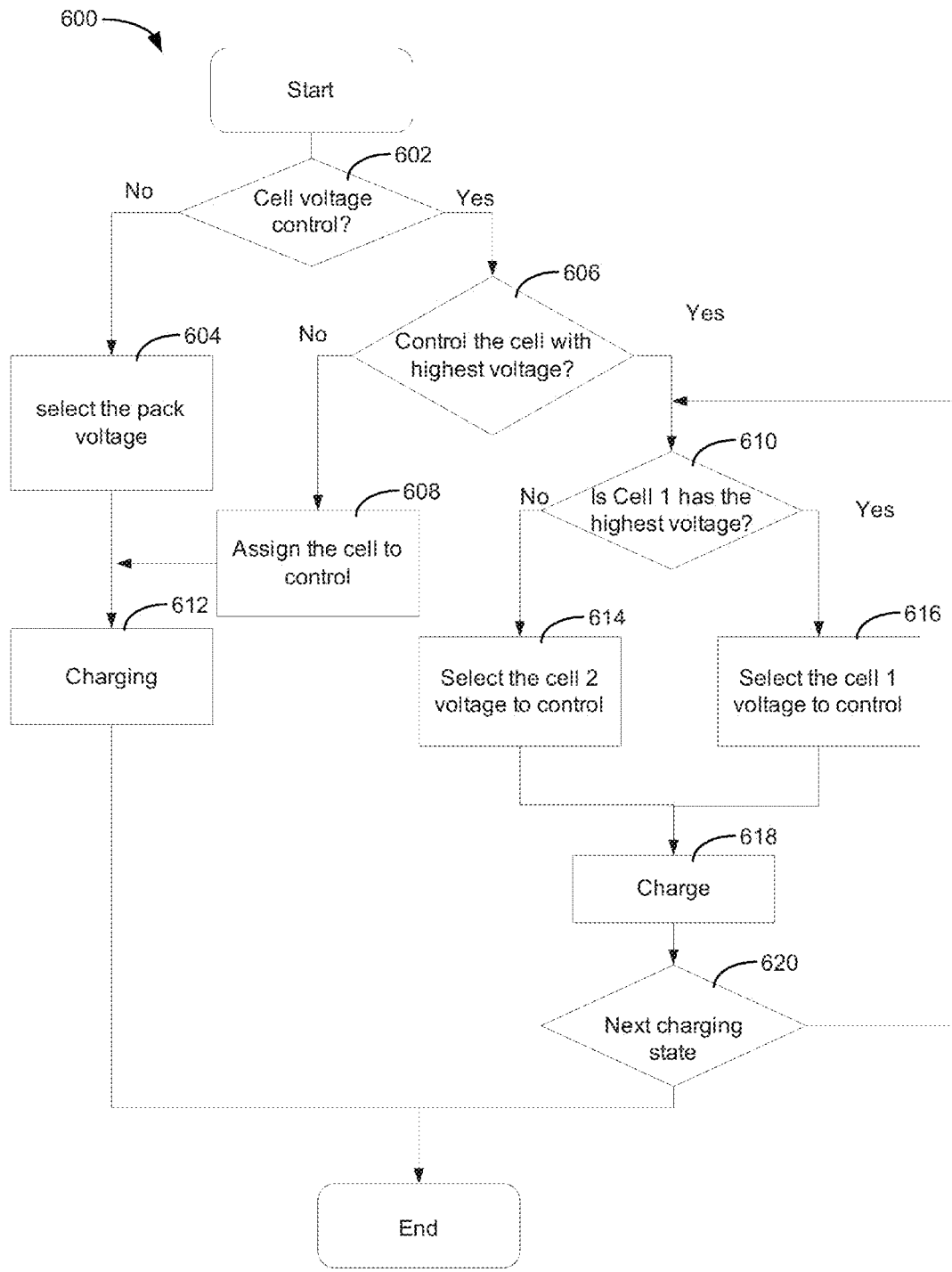
FIG. 6 is a flow diagram illustrating an exemplary method of operating the battery charging system of FIG. 5b.

An exemplary method 600 of operating the battery charging system 501 (see FIGS. 5a-5b) is described below with reference to FIG. 6. As depicted in block 602 (see FIG. 6), a determination is made, within the digital management core 502, as to whether or not to control the charging of battery power using at least one of the Cell Voltages 1, 2. As described herein, such a determination can be made based at least on the measurements of the Pack Voltage and Cell Voltages 1, 2 performed by the measurement component 502.4. As depicted in block 604, in the event the charging of battery power is determined not to be controlled by the Cell Voltage(s) 1, 2, a select signal is provided, to the analog switch 510 by the Bat voltage selection component 502.7, to select the Pack Voltage for controlling the charging of battery power. Further, the charging of battery power is performed under the control of the Pack Voltage, as depicted in block 612, after which the method 600 ends. As depicted in block 606, in the event the charging of battery power is determined to be controlled by the Cell Voltage(s) 1, 2, a determination is made, within the digital management core 502, as to whether or not to control the charging of battery power using the higher Cell Voltage 1, 2. As depicted in block 608, in the event the charging of battery power is determined not to be controlled by the higher Cell Voltage 1, 2, a selected one of the Cell Voltages 1, 2 is assigned, by the digital management core 502, to control the charging of battery power. Further, the charging of battery power is performed under the control of the selected Cell Voltage 1, 2, as depicted in block 612, after which the method 600 ends.

As depicted in block 610, in the event the charging of battery power is determined to be controlled by the higher Cell Voltage 1, 2, a determination is made, by the digital management core 502, as to whether or not Cell Voltage 1 is higher than Cell Voltage 2. In the event Cell Voltage 1 is not higher than Cell Voltage 2, a select signal is provided, to the analog switch 510 by the Bat voltage selection component 502.7, to select Cell Voltage 2 for controlling the charging of battery power, as depicted in block 614. In the event Cell Voltage 1 is higher than Cell Voltage 2, a select signal is provided, to the analog switch 510 by the Bat voltage selection component 502.7, to select Cell Voltage 1 for controlling the charging of battery power, as depicted in block 616. Further, the charging of battery power is performed under the control of the selected Cell Voltage 1 or 2, as depicted in block 618. As depicted in block 620, a determination is made, by the digital management core 502, as to whether or not to enter a subsequent charging state using the Cell Voltage 1 or 2. In the event a subsequent charging state is to be entered using the Cell Voltage 1 or 2, the method 600 loops back from block 620 to block 610. Otherwise, the method 600 ends.

Figure 7:
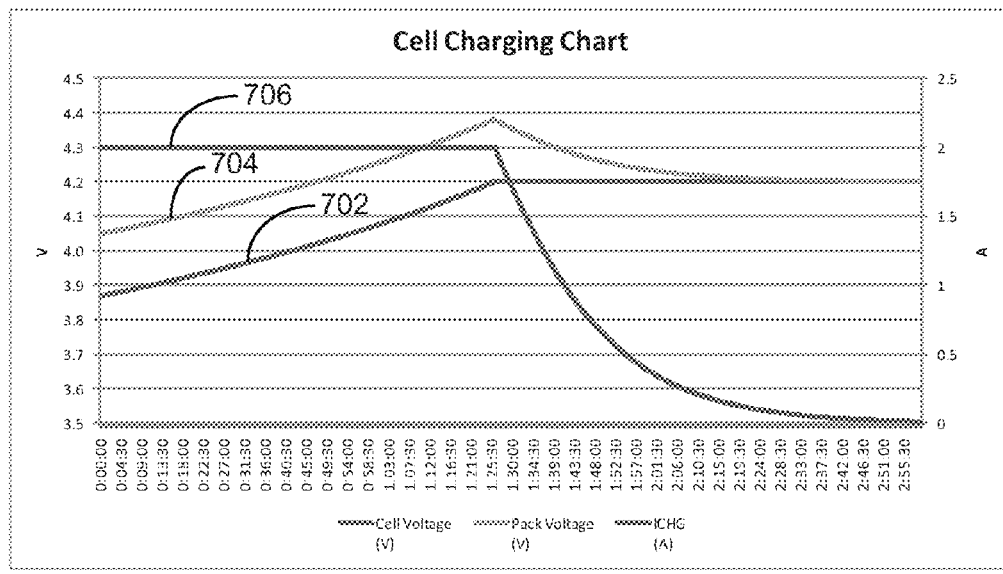
FIG. 7 is a diagram illustrating an exemplary control of battery cell charging using the battery charging system of FIG. 5b.

FIG. 7 depicts battery cell charging times that can be obtained using the battery charging system 501 (see FIGS. 5a-5b). Specifically, FIG. 7 depicts the battery charging current (see reference numeral 706), the battery pack voltage (see reference numeral 704), and a battery cell voltage (see reference numeral 702), over an exemplary time period ranging, e.g., from 0:00:00 to 2:55:30. As shown in FIG. 7, at the end of the exemplary time period (i.e., 2:55:30), the battery cell voltage 702 has reached the target level of the battery pack voltage 704, i.e., 4.2 volts. It is noted that, at about time 1:25:30, the battery pack voltage 704 is significantly higher than the battery cell voltage 702 to compensate for the voltage drop in the charging path resistance.

Figure 8:
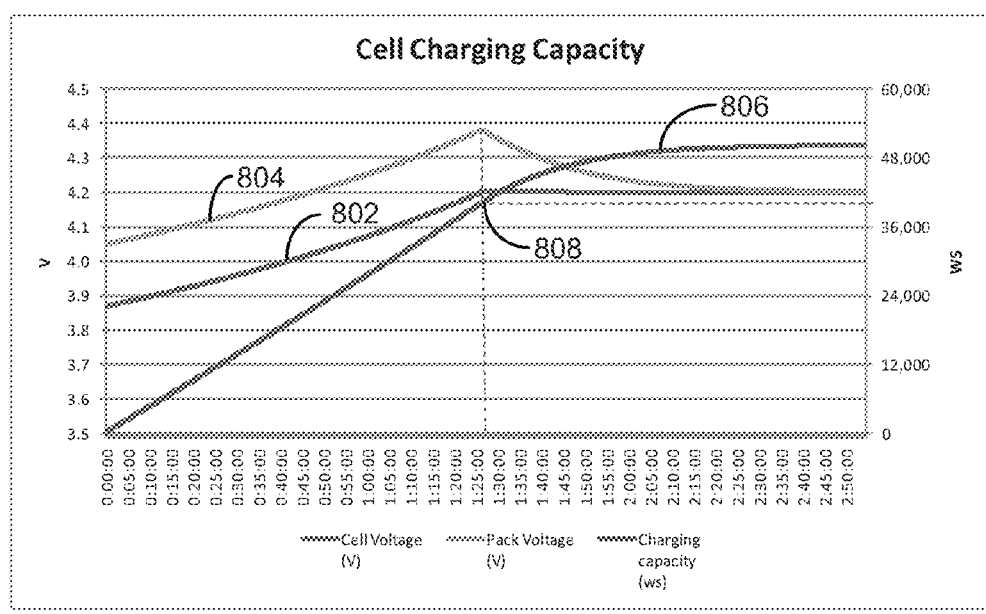
FIG. 8 is a diagram illustrating an exemplary battery cell charging capacity obtained using the battery charging system of FIG. 5b.

FIG. 8 depicts a battery cell charging capacity that can be obtained using the battery charging system 501 (see FIGS. 5a-5b). Specifically, FIG. 8 depicts the battery pack charging capacity (see reference numeral 806), the battery pack voltage (see reference numeral 804), and the battery cell voltage (see reference numeral 802), over an exemplary time period ranging, e.g., from 0:00:00 to 2:50:00. It is noted that reference numeral 808 indicates the end of the fast charging period of battery charging (at about time 1:25:00), during which constant current charging is performed. It is further noted that the battery capacity at the end of the fast charging period, as indicated by reference numeral 808 (see FIG. 8), is higher than the battery capacity at the end of the fast charging period in the conventional approach, as indicated by reference numeral 308 (see FIG. 3).

Figure 9:
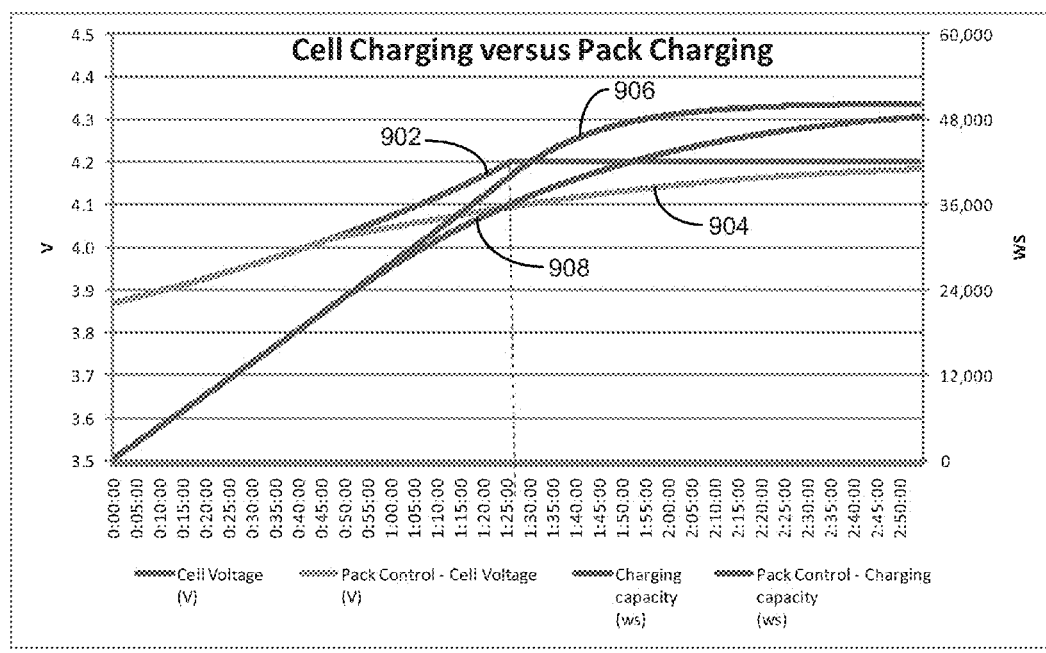
FIG. 9 is a diagram illustrating an exemplary comparison of battery cell charging and battery pack charging using the battery charging system of FIG. 5b.

FIG. 9 depicts a comparison of battery cell charging and battery pack charging, using the battery charging system 501 (see FIGS. 5a-5b). Specifically, over an exemplary time period ranging, e.g., from 0:00:00 to 2:50:00, FIG. 9 depicts a first battery cell voltage (see reference numeral 902) when the battery cell voltage is employed to control the charging of battery power, a second battery cell voltage (see reference numeral 904) when the battery pack voltage is employed to control the charging of battery power, a first battery pack charging capacity (see reference numeral 906) when the battery cell voltage is employed to control the charging of battery power, and a second battery pack charging capacity (see reference numeral 908) when the battery pack voltage is employed to control the charging of battery power. As shown in FIG. 9, at the end of the exemplary time period (i.e., 2:50:00), the first battery cell voltage 902 has reached the target level of the battery pack voltage, i.e., 4.2 volts, whereas the second battery cell voltage 904 has not reached the target voltage level of 4.2 volts. Moreover, the first battery pack charging capacity 906 is higher than the second battery pack charging capacity 908.

It is noted that the exemplary time periods depicted in FIGS. 7-9 are provided for purposes of illustration, and that such time periods can vary based at least on the battery capacity and/or battery charging parameters.

Systems and methods of charging battery power are further disclosed that can selectively perform current-controlled battery charging and voltage-controlled battery charging (such selective current and voltage-controlled battery charging referred to herein as "adaptive battery cell charging") to reduce battery charging times and battery stress, while increasing battery charge/discharge life cycles. Such systems and methods can perform adaptive battery cell charging by adaptively controlling the level of a battery charging current based at least on the overall voltage level of a battery pack and/or the voltage level of a selected battery cell within the battery pack, as well as by adaptively controlling the level of a battery charging voltage based at least on the level of the battery charging current.

Figure 10A:
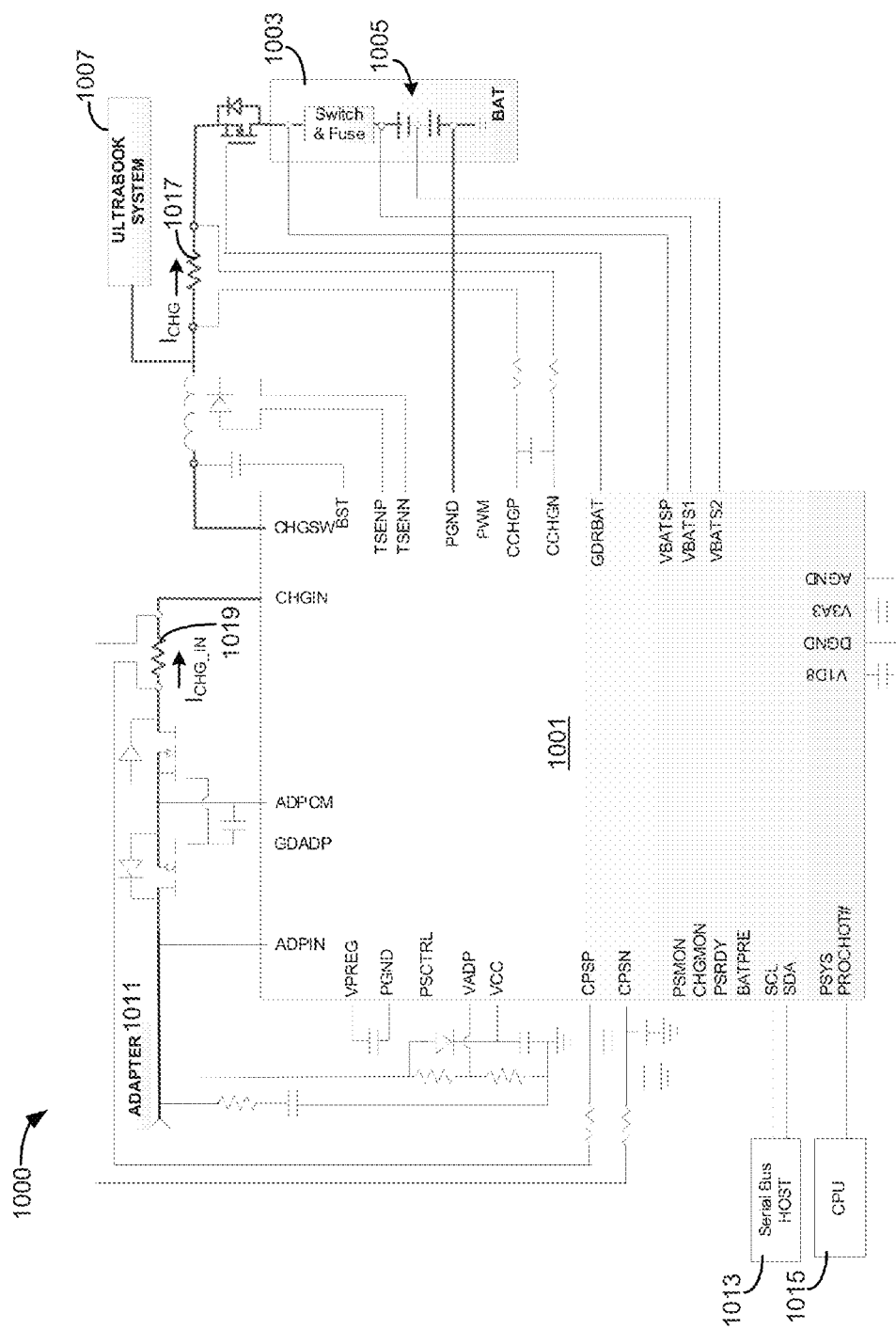
FIG. 10a is a schematic diagram of an exemplary target configuration of an exemplary adaptive battery cell charging system, in further accordance with the present application.

FIG. 10a depicts an exemplary target configuration 1000 of an exemplary battery charging system 1001, in accordance with the present application. As shown in FIG. 10a, the target configuration 1000 includes the battery charging system 1001 operatively coupleable to an alternating current (AC) adapter port 1011, a computer system such as an Ultrabook® computer system 1007, and a battery pack 1003, as well as a serial bus host 1013 and a central processing unit (CPU) 1015. The battery pack 1003 includes a plurality of battery cells 1005. Each of the plurality of battery cells 1005 can be a single cell or multiple cells in parallel. An AC adapter (not shown) connectable to the AC adapter port 1011 is operative to convert AC power to a predetermined DC power (e.g., $16V_{DC}$ to $20V_{DC}$) for generating an input battery charging current ($I_{CHG\_IN}$) which, having been applied to a node CHGIN of a power stage 1016 (see FIG. 10b) within the battery charging system 1001, can be used to generate a battery charging current ($I_{CHG}$) for charging the battery pack 1003.

Figure 10B:
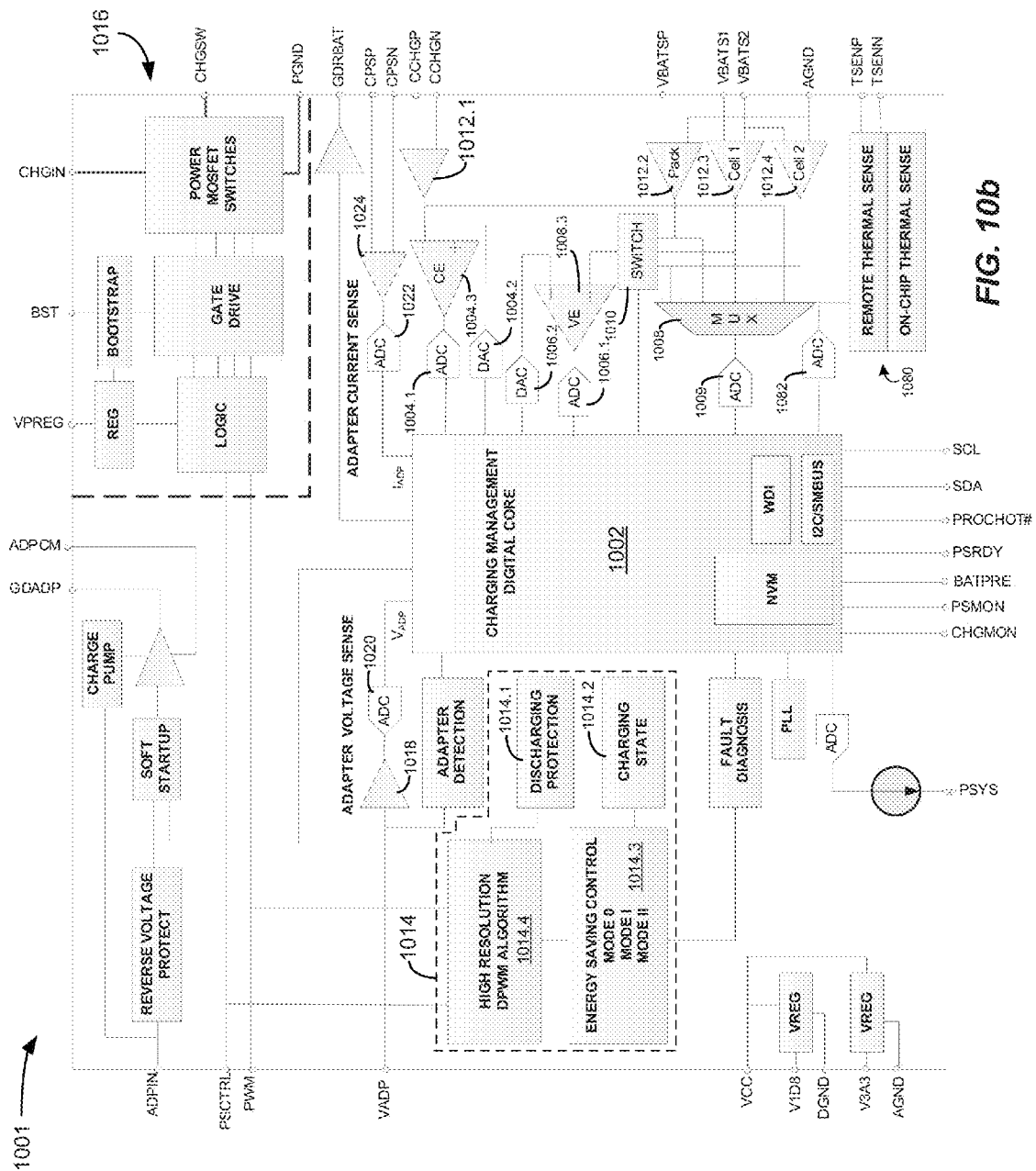

FIG. 10b depicts an illustrative embodiment of the battery charging system 1001. As shown in FIG. 10b, the battery charging system 1001 includes a digital management core 1002, a plurality of current/voltage sense amplifiers 1012.1-1012.4, 1018, 1024, a charging signal generation module 1014, and the power stage 1016 for generating the battery charging current, $I_{CHG}$. For example, the battery charging system 1001 may be employed to charge battery power provided by a battery pack (e.g., the battery pack 1003; see FIG. 10a) that includes one battery cell, two series-connected battery cells, three series-connected battery cells, four series-connected battery cells, or any other suitable number of battery cells in any other suitable battery cell configuration.

In an exemplary mode of operation, the voltage sense amplifier 1018 senses or monitors a level of an AC adapter voltage ($V_{ADP}$), and provides the AC adapter voltage $V_{ADP}$ in analog form to an analog-to-digital converter (ADC) 1020, which, in turn, provides the AC adapter voltage $V_{ADP}$ in digital form to the digital management core 1002. Further, the current sense amplifier 1024 senses or monitors a level of an AC adapter current ($I_{ADP}$) across a current sense resistor 1019 (see FIG. 10a) between nodes CPSP, CPSN, and provides a representation of the AC adapter current $I_{ADP}$ in analog form to an ADC 1022, which, in turn, provides a representation of the AC adapter current $I_{ADP}$ in digital form to the digital management core 1002.

The current sense amplifier 1012.1 senses or monitors a level of the battery charging current ($I_{CHG}$) across a current sense resistor 1017 (see FIG. 10a) between nodes CCHGP, CCHGN, the voltage sense amplifier 1012.2 senses or monitors a level of the battery pack voltage at a battery node VBATSP, the voltage sense amplifier 1012.3 senses or monitors a level of a first battery cell voltage at a battery node VBATS1, and the voltage sense amplifier 1012.4 senses or monitors a level of a second battery cell voltage at a battery node VBATS2. The current/voltage sense amplifiers 1012.1-1012.4 provide analog voltages proportional to the monitored battery charging current (BAT Current), battery pack voltage (Pack Voltage), and first and second battery cell voltages (Cell Voltage 1, Cell Voltage 2), respectively, to a multiplexer 1008. The digital management core 1002 provides at least one select signal to the multiplexer 1008 for selecting at least one of the respective analog voltages (BAT Current, Pack Voltage, Cell Voltage 1, Cell Voltage 2). The multiplexer 1008 provides the selected analog voltage(s) to an ADC 1009, which converts the selected analog voltage(s) to digital form, and provides the selected voltage(s) in digital form to the digital management core 1002. Upon start-up of the charging of battery power, the ADC 1009 can convert the respective analog voltages (BAT Current, Pack Voltage, Cell Voltage 1, Cell Voltage 2) to digital form, and store them in registers within the digital management core 1002.

Having received the selected voltage(s) (BAT Current, Pack Voltage, Cell Voltage 1, Cell Voltage 2) in digital form from the ADC 1009, the digital management core 1002 measures the selected voltage(s). Based at least at least on the measured voltage(s), the digital management core 1002 selects the Pack Voltage, the Cell Voltage 1, or the Cell Voltage 2, to control the charging of battery power provided by the battery pack for a predetermined period of battery charging. The selected Pack Voltage, Cell Voltage 1, or Cell Voltage 2 is provided, via an analog switch 1010, to a voltage loop error detection circuit, which includes an ADC 1006.1, a digital-to-analog converter (DAC) 1006.2, and a comparator 1006.3. The digital management core 1002 provides a specified target voltage level, in digital form, for the selected Pack Voltage, Cell Voltage 1, or Cell Voltage 2 to the DAC 1006.2, which converts the target voltage level to analog form, and provides the target voltage level in analog form to the comparator 1006.3. The comparator 1006.3 compares the selected Pack Voltage, Cell Voltage 1, or Cell Voltage 2 to the target voltage level, and, based at least on the comparison, provides an analog voltage proportional to a voltage error deviation to the ADC 1006.1. The ADC 1006.1 provides a digital signal representative of the voltage error deviation to the digital management core 1002.

The monitored battery charging current (BAT Current) is provided to a current loop error detection circuit, which includes an ADC 1004.1, a DAC 1004.2, and a comparator 1004.3. The digital management core 1002 provides a digital output proportional to a specified target current level for the BAT Current to the DAC 1004.2, which converts the target current level to analog form, and provides the target current level in analog form to the comparator 1004.3. The comparator 1004.3 compares the BAT Current to the target current level, and, based at least on the comparison, provides an analog voltage proportional to a current error deviation to the ADC 1004.1. The ADC 1004.1 provides a digital signal representative of the current error deviation to the digital management core 1002.

Having received the voltage and current error deviation signals, the digital management core 1002 provides representations of the voltage/current error deviation signals to the charging signal generation module 1014, which can include a discharging protection sub-module 1014.1, a charging state sub-module 1014.2, and an energy saving control sub-module 1014.3, as well as a sub-module 1014.4 for implementing a high resolution digital PWM (DPWM) algorithm or any other suitable PWM algorithm. Using the voltage/current error deviation signals, the charging signal generation module 1014 generates a control signal for controlling the generation of a charging signal (e.g., a DPWM or PWM signal) that operates to minimize the respective voltage and current error deviation signals. The charging signal generation module 1014 provides the charging signal to the power stage 1016, which uses the charging signal to generate, at a node CHGSW (see also FIG. 10*a*), the battery charging current $I_{CHG}$ from the input battery charging current $I_{CHG\_IN}$ provided at the node CHGIN (see also FIG. 10*a*).

Figure 10C:
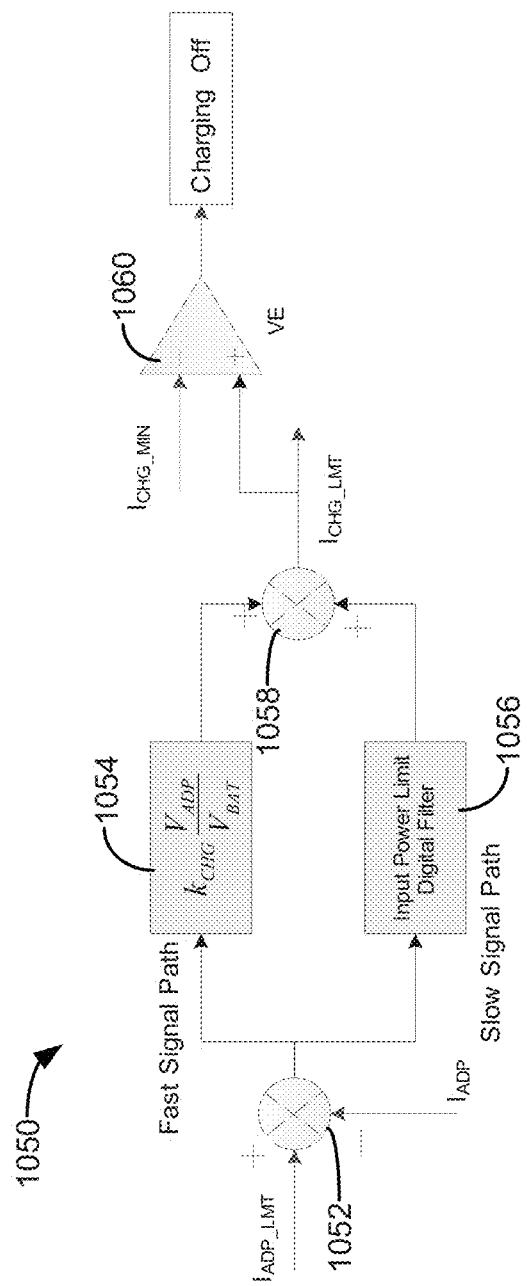
FIG. 10c is a functional diagram representing the operation of an exemplary circuit that can be implemented in the adaptive battery cell charging system of FIG. 10b, for use in determining a battery charging current limit for an alternating current (AC) adapter employed in conjunction with the adaptive battery cell charging system of FIG. 10b.
Figure 11:
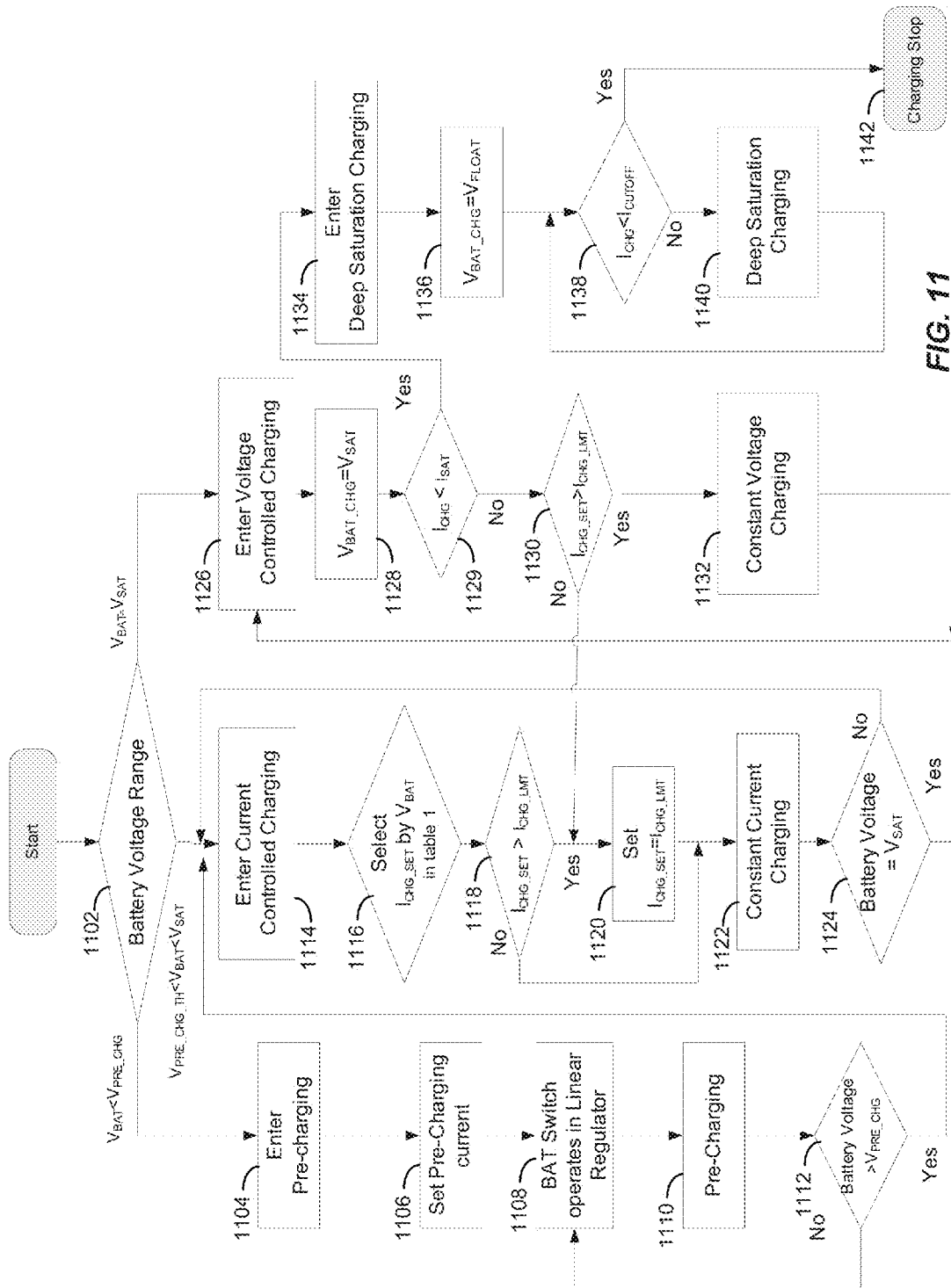
FIG. 11 is a flow diagram illustrating an exemplary method of operating the adaptive battery cell charging system of FIG. 10b.

FIG. 10*c* is a functional diagram representing the operation of an exemplary circuit 1050 that can be implemented in the digital management core 1002 (see FIGS. 10*a*, 10*b*) for determining a battery charging current limit ($I_{CHG\_LMT}$) that can result from the AC adapter reaching its output current limit ($I_{ADP\_LMT}$). As shown in FIG. 10*c*, representations of the AC adapter current $I_{ADP}$ and the output current limit $I_{ADP\_LMT}$ of the AC adapter are applied to a summer node 1052, which takes the difference between the output current limit $I_{ADP\_LMT}$ and the AC adapter current $I_{ADP}$, and provides the difference ($I_{ADP\_LMT}$–$I_{ADP}$) over a slow signal path to a block 1056, as well as over a fast signal path to a block 1054. The block 1056 implements an input power limit digital filter, and provides the filtered output power limit to a summer node 1058. The block 1054 implements a ratio of the AC adapter voltage $V_{ADP}$ and the battery (pack or cell) voltage ($V_{BAT}$) multiplied by a predetermined constant ($k_{CHG}$), and provides an output to the summer node 1058, which sums the respective outputs of the blocks 1054, 1056 to generate the battery charging current limit $I_{CHG\_LMT}$ with minimal delay.

As further shown in FIG. 10*c*, the battery charging current limit $I_{CHG\_LMT}$ is provided to a comparator 1060, which compares the battery charging current limit $I_{CHG\_LMT}$ to a representation of a specified minimum battery charging current ($I_{CHG\_MIN}$). In the event the battery charging current limit $I_{CHG\_LMT}$ is less than the specified minimum battery charging current $I_{CHG\_MIN}$, the comparator 1060 generates a signal ("Charging Off") for use in terminating, at least temporarily, adaptive battery cell charging by the battery charging system 1001. It is noted that the AC adapter current $I_{ADP}$ is representative of the system current and the battery charging current, and therefore the circuit 1050 effectively monitors both the system current and battery charging current when determining the battery charging current limit $I_{CHG\_LMT}$. The operation of the circuit 1050 will be discussed in further detail below.

An exemplary method of operating the disclosed battery charging system 1001 is described below with reference to FIGS. 10*a*-10*c*, 11, and 12, as well as TABLE I. In this exemplary method, it is understood that the charging of battery power provided by a battery pack (e.g., the battery pack 1003; see FIG. 10*a*) is managed and controlled by a digital management core (e.g., the digital management core 1002; see FIG. 10*b*) included in the battery charging system 1001.

TABLE I

| Step | Minimum voltage | Maximum voltage | Charging current set ($I_{CHG\_SET}$) | Notes |
|---|---|---|---|---|
| 1 | | $V_{PRE\_CHG\_TH}$ | $I_{PRE\_CHG}$ | Pre-charging threshold |
| 2 | Vn1 | Vn2 | In1 | Current- |

TABLE I-continued

| Step | Minimum voltage | Maximum voltage | Charging current set ($I_{CHG\_SET}$) | Notes |
|---|---|---|---|---|
| 3 | Vn2 | Vn3 | In2 | controlled |
| 4 | Vn3 | Vn4 | In3 | charging |
| 5 | Vn4 | Vn5 | In4 | region |

As depicted in block 1102 (see FIG. 11), the range of the battery voltage ($V_{BAT}$) is determined. In the event the range of the battery voltage $V_{BAT}$ is determined to be less than a specified pre-charging threshold voltage ($V_{PRE\_CHG\_TH}$; see TABLE I) (e.g., the battery pack may be in a zero-volt state), the method enters a pre-charging mode of operation, as depicted in block 1104. In the event the range of the battery voltage $V_{BAT}$ is determined to be less than a specified voltage saturation level ($V_{SAT}$), but greater than the specified pre-charging threshold voltage $V_{PRE\_CHG\_TH}$, the method enters a current-controlled battery charging mode of operation, as depicted in block 1114. In the event the battery voltage $V_{BAT}$ is determined to be equal to the specified voltage saturation level $V_{SAT}$, the method enters a voltage-controlled battery charging mode of operation, as depicted in block 1126.

In the pre-charging mode of operation, the level of the battery charging current ($I_{CHG}$) is set to a small pre-charging current level (i.e., $I_{CHG\_SET}=I_{PRE\_CHG}$; see TABLE I, Step 1), as depicted in block 1106, and battery pre-charging is performed, as depicted in blocks 1108, 1110, and 1112. As depicted in block 1112, a determination is made as to whether or not the battery voltage $V_{BAT}$ has exceeded the specified pre-charging threshold voltage $V_{PRE\_CHG\_TH}$, which is the maximum battery voltage for battery pre-charging. In the event the battery voltage $V_{BAT}$ has not yet exceeded the specified pre-charging threshold voltage $V_{PRE\_CHG\_TH}$, the method loops back from block 1112 to block 1108 to continue performing battery pre-charging. In the event the battery voltage $V_{BAT}$ has exceeded the specified pre-charging threshold voltage $V_{PRE\_CHG\_TH}$, the method enters the current-controlled battery charging mode of operation, as depicted in block 1114.

In the current-controlled battery charging mode of operation, the setting of the battery charging current ($I_{CHG\_BET}$) is selected, as depicted in block 1116, based at least on the level of the battery voltage $V_{BAT}$, in accordance with TABLE I. For example, if $V_{n1} \leq V_{BAT} < V_{n2}$, then $I_{CHG\_SET}=I_{n1}$ (see TABLE I, Step 2); if $V_{n2} \leq V_{BAT} < V_{n3}$, then $I_{CHG\_SET}=I_{n2}$ (see TABLE I, Step 3); if $V_{n3} \leq V_{BAT} < V_{n4}$, then $I_{CHG\_SET}=I_{n3}$ (see TABLE I, Step 4); and, if $V_{n4} \leq V_{BAT} < V_{n5}$, then $I_{CHG\_SET}=I_{n4}$ (see TABLE I, Step 5) (see also FIG. 12; reference numeral 1202 ($I_{CHG}$), and reference numeral 1204 ($V_{BAT}$)). During this current-controlled battery charging mode of operation, the charging of battery power is effectively performed in multiple sessions, specifically, a first session in which the battery charging current $I_{CHG}$ is set to $I_{n1}$, a second session in which the battery charging current $I_{CHG}$ is set to $I_{n2}$, a third session in which the battery charging current $I_{CHG}$ is set to $I_{n3}$, and at least a fourth session in which the battery charging current $I_{CHG}$ is set to $I_{n4}$. It is noted that the setting of the battery charging current $I_{CHG}$ during each battery charging session can be determined using a lookup table (e.g., TABLE I), or in any other suitable manner.

It is further noted that, although TABLE I specifies four (4) battery charging sessions (see TABLE I, Steps 2-5), any other suitable number of battery charging sessions may be employed. Further, the default levels of voltage ($V_{n1}$, $V_{n2}$, $V_{n3}$, $V_{n4}$, $V_{n5}$) and current ($I_{n1}$, $I_{n2}$, $I_{n3}$, $I_{n4}$) specified in TABLE I can be pre-programmed in nonvolatile memory (NVM) within the digital management core 1002 (see FIG. 10*b*). Upon system start-up, these default levels can be loaded into registers within the digital management core 1002. It should be understood, however, that one or more of these default levels can be changed in real-time by system control software, e.g., via a serial communications interface (e.g., I2C/SMBUS), or any other suitable communications interface, to the digital management core 1002.

For example, the battery charging system 1001 (see FIG. 10*b*) includes a remote/on-chip thermal sense component 1080 operative to sense temperature, and to provide an indication of the sensed temperature, in analog form, to an analog-to-digital converter (ADC) 1082. The ADC 1082 can convert the sensed temperature from analog form to digital form, and provide an indication of the sensed temperature, in digital form, to the digital management core 1002. As the temperature sensed by the thermal sense component 1080 increases, the system control software can reduce the default levels of current, such as the current levels ($I_{n1}$, $I_{n2}$, $I_{n3}$, $I_{n4}$) specified in TABLE I, by a suitable amount, thereby reducing the heat dissipation of the battery charging system 1001. In this way, over-heating of the system can be avoided, while improving system reliability.

As depicted in block 1118, a determination is made as to whether or not the setting of the battery charging current $I_{CHG\_SET}$ is greater than the battery charging current limit $I_{CHG\_LMT}$ (see also FIG. 10*c*), which can result from the AC adapter reaching its output current limit $I_{ADP\_LMT}$. In the event the setting of the battery charging current $I_{CHG\_SET}$ is determined to be greater than the battery charging current limit $I_{CHG\_LMT}$, the battery charging current $I_{CHG\_SET}$ is set to be equal to the battery charging current limit $I_{CHG\_LMT}$ ($I_{CHG\_SET}=I_{CHG\_LMT}$), as depicted in block 1120. Accordingly, when the battery charging system 1001 consumes an amount of current that causes the AC adapter to operate in a power limit state, the battery charging current $I_{CHG\_SET}$ is set to be equal to the battery charging current limit $I_{CHG\_LMT}$.

Current-controlled battery charging is then performed, as depicted in block 1122. As depicted in block 1124, a determination is made as to whether or not the battery voltage $V_{BAT}$ is equal to the specified voltage saturation level $V_{SAT}$. In the event the battery pack voltage $V_{BAT}$ is not yet equal to the specified voltage saturation level $V_{SAT}$, the method loops back from block 1124 to block 1114 to continue operating in the current-controlled battery charging mode of operation. In the event the battery pack voltage $V_{BAT}$ is determined to be equal to the specified voltage saturation level $V_{SAT}$, the method enters the voltage-controlled battery charging mode of operation, as depicted in block 1126 (see also FIG. 12; reference numeral 1204 ($V_{BAT}=V_{SAT}$)).

In the voltage-controlled battery charging mode of operation, the battery charging voltage ($V_{BAT\_CHG}$) is initially equal to the specified voltage saturation level $V_{SAT}$, as depicted in block 1128. As depicted in block 1129, a determination is made as to whether or not the battery charging current $I_{CHG}$ is less than a specified current saturation level ($I_{SAT}$) ($I_{CHG}<I_{SAT}$) (see also FIG. 12; reference numeral 1202). In the event the battery charging current $I_{CHG}$ is less than the specified current saturation level $I_{SAT}$, the method enters a deep saturation charging sub-mode of operation, as depicted in block 1134. Otherwise, a determination is made as to whether or not the setting of the battery charging current $I_{CHG\_SET}$ is greater than the battery charging current limit $I_{CHG\_LMT}$ (see also FIG. 10*c*), which can result from the AC adapter reaching its output current limit $I_{ADP\_LMT}$. In the event the setting of the battery charging current $I_{CHG\_SET}$ is greater than the battery charging current limit $I_{CHG\_LMT}$, the method proceeds to block 1120, returning to the current-controlled battery charging mode of operation. Otherwise, voltage-controlled battery charging is performed, as depicted in block 1132, and the method loops back from block 1132 to block 1126 to continue operating in the voltage-controlled battery charging mode of operation.

Upon entering the deep saturation charging sub-mode of operation ($I_{CHG}<I_{SAT}$; see block 1134), the battery charging voltage $V_{BAT\_CHG}$ is reduced to a specified battery float voltage ($V_{FLOAT}$), as depicted in block 1136. For example, the battery charging voltage $V_{BAT\_CHG}$ can be reduced to the specified battery float voltage $V_{FLOAT}$ by about 20-200 mV, or any other suitable amount of voltage. As depicted in block 1138, a determination is made as to whether or not the battery charging current $I_{CHG}$ is less than a specified current cutoff level ($I_{CUTOFF}$) (see also FIG. 12; reference numeral 1202 ($I_{CHG}<I_{CUTOFF}$)). In the event the battery charging current $I_{CHG}$ is less than the specified current cutoff level $I_{CUTOFF}$, the charging of battery power is completed ("Charging Stop"; see block 1142). Otherwise, deep saturation charging is performed, as depicted in block 1140, and the method loops back from block 1140 to block 1138 to continue performing deep saturation charging.

Figure 13:
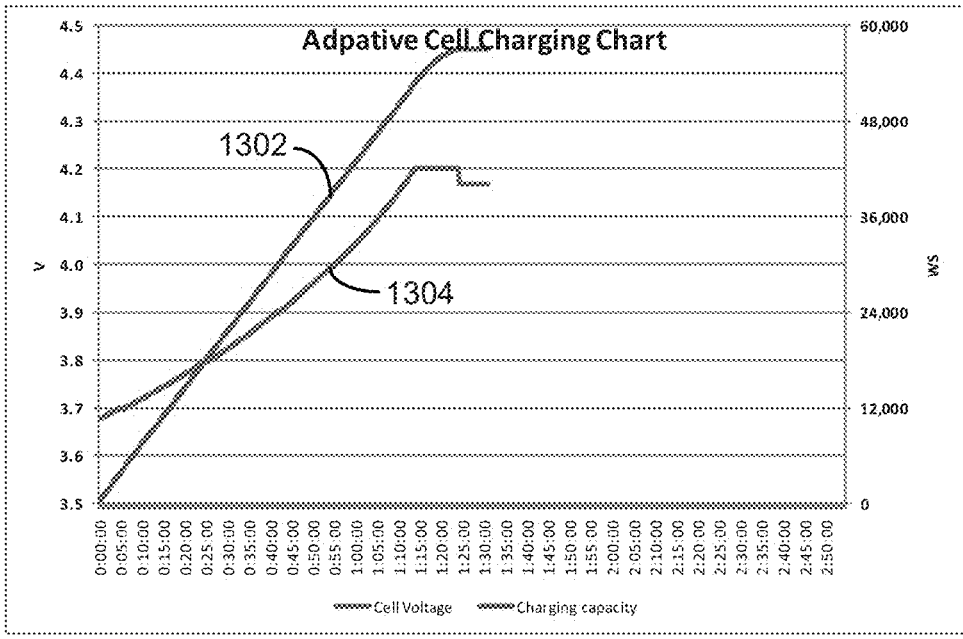
FIG. 13 is a diagram illustrating an exemplary battery cell charging capacity obtained using the adaptive battery cell charging system of FIG. 10b.

FIG. 13 depicts a battery cell charging capacity that can be obtained using the battery charging system 1001 (see FIGS. 10*a*-10*b*). Specifically, FIG. 13 depicts the battery pack charging capacity (see reference numeral 1302), and the battery charging voltage (see reference numeral 1304), over an exemplary time period ranging, e.g., from 0:00:00 to 2:50:00. It is noted that, with reference to FIG. 13, the battery charging system 1001 performs current-controlled battery charging in a first time interval ranging from about 0:00:00 to about 1:15:00, and performs voltage-controlled battery charging in a second time interval ranging from about 1:15:00 to about 1:30:00. It is further noted that the battery pack charging capacity (see reference numeral 1302) at the end of the second time interval (at about 1:30:00) is higher than might be achievable using a conventional battery charging approach. Such a high battery pack charging capacity (see reference numeral 1302) is also achieved in a significantly short period of time.

Figure 14:
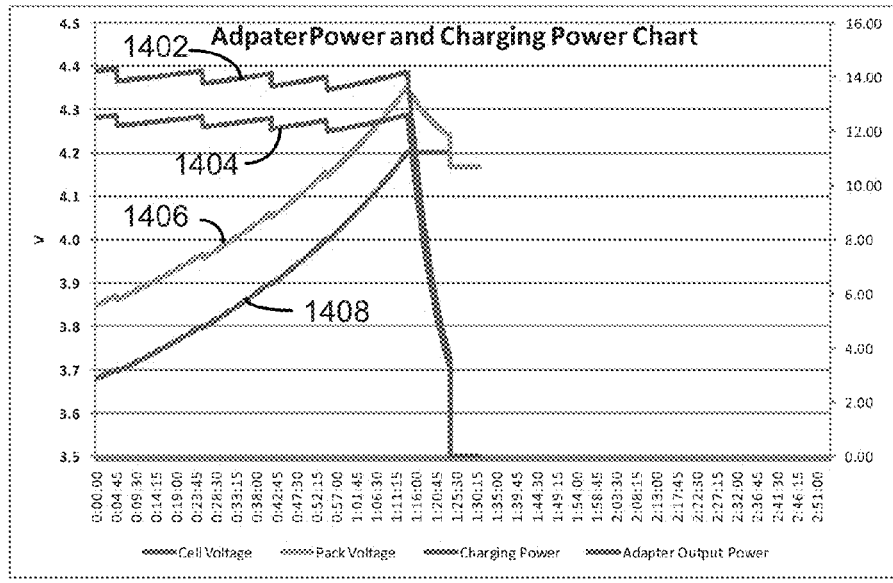
FIG. 14 is a diagram illustrating an exemplary AC adapter output power and an exemplary battery charging power obtained using the adaptive battery cell charging system of FIG. 10b.

FIG. 14 depicts an AC adapter output power and a battery charging power that can be obtained using the battery charging system 1001 (see FIGS. 10*a*-10*b*). Specifically, FIG. 14 depicts the AC adapter output power (see reference numeral 1402), the battery charging power (see reference numeral 1404), the battery pack voltage (see reference numeral 1406), and the battery charging voltage (see reference numeral 1408). It is noted that, with reference to FIG. 14, the battery charging system 1001 performs current-controlled battery charging in a first time interval ranging from about 0:00:00 to about 1:16:00, and performs voltage-controlled battery charging in a second time interval ranging from about 1:16:00 to about 1:30:15. It is further noted that the AC adapter output power (see reference numeral 1402), as well as the battery charging power (see reference numeral 1404), within the first time interval (about 0:00:00 to 1:16:00), are higher than might be achievable using a conventional battery charging approach.

Figure 15:
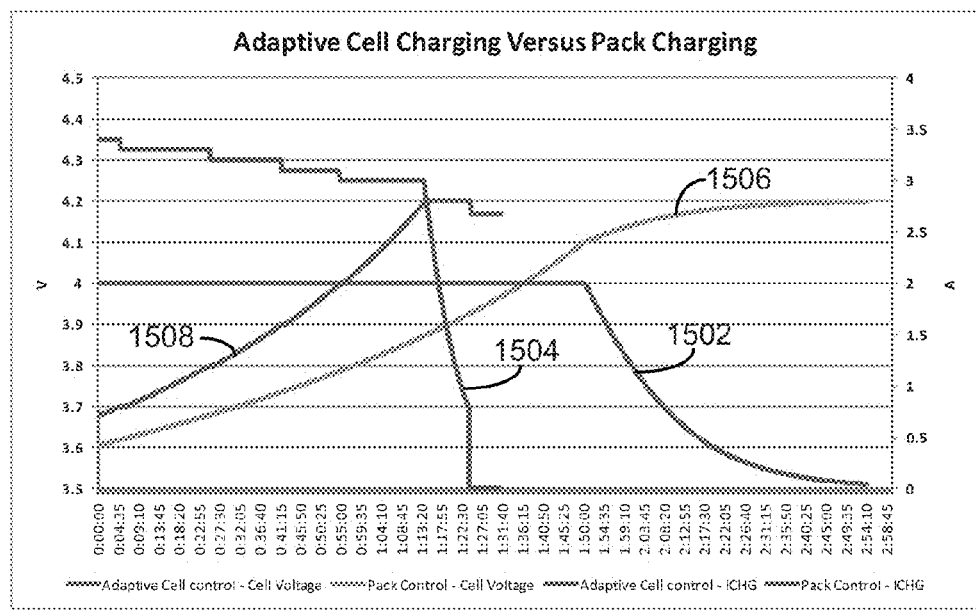
FIG. 15 is a diagram illustrating an exemplary comparison of adaptive battery cell charging using the adaptive battery cell charging system of FIG. 10b and conventional battery pack charging.

FIG. 15 depicts a comparison of adaptive battery cell charging using the battery charging system 1001 (see FIGS. 10*a*-10*b*), and battery pack charging using a conventional approach, over an exemplary time period ranging, e.g., from 0:00:00 to 2:58:45. Specifically, FIG. 15 depicts a first battery charging current (see reference numeral 1504) and a first battery charging voltage (see reference numeral 1508) resulting from adaptive battery cell charging, as well as a second battery charging current (see reference numeral 1502) and a second battery charging voltage (see reference numeral 1506) resulting from battery pack charging using the conventional approach. As shown in FIG. 15, the charging of battery power is completed at about the time 2:54:10 using conventional battery pack charging, and completed in about half that time (e.g., at about time 1:31:40) using adaptive battery cell charging.

Figure 16:
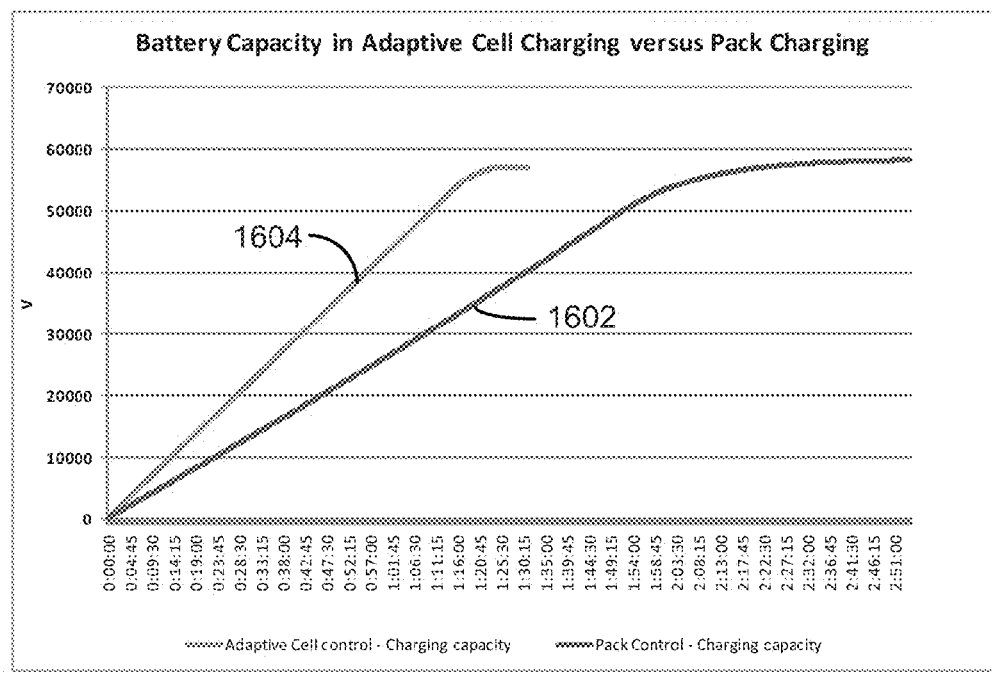
FIG. 16 is a diagram illustrating an exemplary comparison of battery capacities resulting from adaptive battery cell charging using the adaptive battery cell charging system of FIG. 10b and conventional battery pack charging.

FIG. 16 depicts a comparison of battery capacities resulting from adaptive battery cell charging using the battery charging system 1001 (see FIGS. 10a-10b) and conventional battery pack charging, over an exemplary time period ranging, e.g., from 0:00:00 to 2:51:00. Specifically, FIG. 16 depicts a first battery pack charging capacity (see reference numeral 1604) resulting from adaptive battery cell charging, as well as a second battery pack charging capacity (see reference numeral 1602) resulting from battery pack charging using the conventional approach. As shown in FIG. 16, the second battery pack charging capacity (see reference numeral 1602) obtained using conventional battery pack charging reaches its highest level at about time 2:51:00, while the first battery pack charging capacity (see reference numeral 1604) obtained using adaptive battery cell charging reaches its highest level in about half that time (e.g., at about time 1:30:15).

It is noted that the exemplary time periods depicted in FIGS. 12-16 are provided for purposes of illustration, and that such time periods can vary based at least on the battery capacity and/or battery charging parameters.

Figure 12:
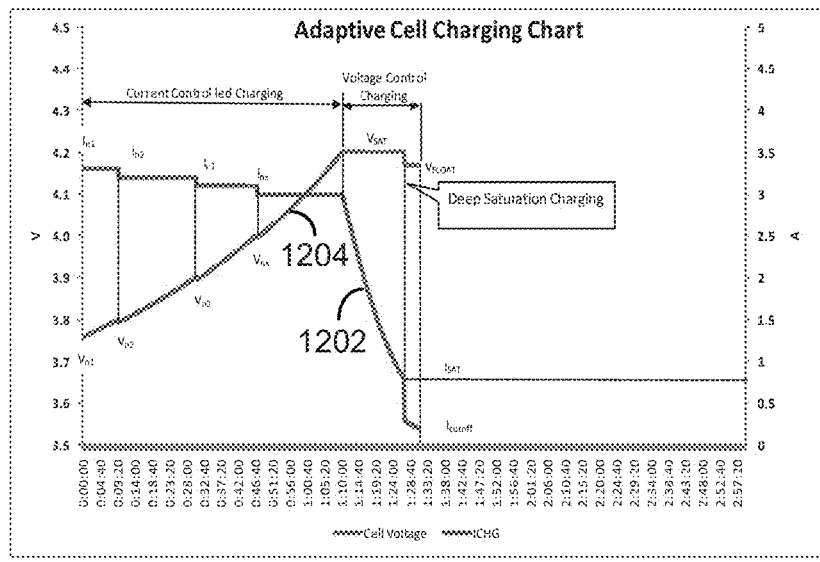
FIG. 12 is a diagram illustrating exemplary battery cell charging times that can be achieved using selective current-controlled battery charging and voltage-controlled battery charging (such selective current and voltage-controlled battery charging referred to herein as "adaptive battery cell charging"), such adaptive battery cell charging being performed using the adaptive battery cell charging system of FIG. 10b.

By performing adaptive battery cell charging, the disclosed battery charging system 1001 (see FIGS. 10a, 10b) can reduce battery charging times and battery stress, while increasing battery charge/discharge life cycles. As described herein, such adaptive battery cell charging involves current-controlled battery charging and voltage-controlled battery charging. During current-controlled battery charging, the charging of battery power is effectively performed in multiple charging sessions. In each session, the battery charging current $I_{CHG}$ can be set to the maximum current that the AC adapter allows at a given battery charging voltage $V_{BAT}$. Further, in each session, the level of the battery charging current $I_{CHG}$ can be set in relation to specified voltage points ($V_{n1}$, $V_{n2}$, $V_{n3}$, . . . $V_{nx}$) of the battery charging voltage $V_{BAT}$. As the battery charging voltage $V_{BAT}$ increases, the battery charging current $I_{CHG}$ is reduced. The battery charging system 1001 can be configured to implement slew rate control to control the maximum rate of change of the battery charging current $I_{CHG}$ as it transitions between the multiple charging sessions. Moreover, in each session, the setting of the battery charging current $I_{CHG}$ is limited by the maximum current that the battery pack 1003 can take while charging, as well as the power capability of the AC adapter. Although FIG. 12 depicts four (4) such sessions of current-controlled battery charging ($I_{n1}$, $I_{n2}$, $I_{n3}$, $I_{n4}$), it should be understood that any other suitable number of charging sessions may be employed.

During voltage-controlled battery charging, if it is determined that the battery charging current $I_{CHG}$ is greater than the battery charging current limit $I_{CHG\_LMT}$, then the battery charging system 1001 can transition from the voltage-controlled battery charging mode of operation back to the current-controlled battery charging mode of operation, at which time the battery charging current $I_{CHG}$ can be set to be equal to the battery charging current limit $I_{CHG\_LMT}$. Moreover, if the battery charging current limit $I_{CHG\_LMT}$ is determined to be less than the specified minimum battery charging current $I_{CHG\_MIN}$, then adaptive battery cell charging can be terminated, at which time the AC adapter can be used to supply power only to, e.g., the Ultrabook® computer system 1007, without also being used to charge the battery pack 1003. The charging of the battery pack 1003 can subsequently be reactivated when the battery charging current limit $I_{CHG\_LMT}$ again exceeds the specified minimum battery charging current $I_{CHG\_MIN}$. It is noted that such voltage-controlled battery charging can be performed using the voltage of the battery pack 1003 as the control voltage, or one or more voltages of the battery cells 1005 as the control voltage(s).

During deep saturation battery charging, the battery float voltage can be optimized in the final stage of battery charging without significantly extending the battery charging time. Such optimization of the battery float voltage can promote long charge/discharge life cycles while avoiding quick aging of the battery pack 1003, reduce stresses on the anode, cathode, and/or insulator inside the battery pack based at least on their chemical characteristics, as well as reduce the rate of increase of internal resistance within the battery pack. The battery charging system 1001 can be further configured to implement slew rate control to control the maximum rate of change of the battery charging voltage $V_{BAT}$ during such optimization of the battery float voltage.

As hereinbefore described, specified levels ($V_{n1}$, $V_{n2}$, $V_{n3}$, . . . ) of the battery charging voltage, $V_{BAT}$, as well as specified levels ($I_{n1}$, $I_{n2}$, $I_{n3}$, . . . ) of the battery charging current, $I_{CHG}$, can be programmed into the nonvolatile memory (NVM) of the digital management core 1002 (see FIG. 10b). Such specified voltage levels ($V_{n1}$, $V_{n2}$, $V_{n3}$, . . . ) and such specified current levels ($I_{n1}$, $I_{n2}$, $I_{n3}$, . . . ) define a charging voltage profile and a charging current profile, respectively, each of which can be loaded into internal registers from the NVM upon system start-up. It is noted that the plurality of battery cells 1005 (see FIG. 10a) included in the battery pack 1003 (see FIG. 10a) can be manufactured in volume production in different batches, and can also be produced by different manufacturers. As a result, the battery cells 1005 can possibly exhibit significant variation in their respective charging voltage/current profiles.

To account for such possible variation in the respective charging voltage/current profiles of the battery cells 1005, the charging voltage profile and the charging current profile defined by the specified voltage levels ($V_{n1}$, $V_{n2}$, $V_{n3}$, . . . ) and the specified current levels ($I_{n1}$, $I_{n2}$, $I_{n3}$, . . . ), respectively, can be changed by modifying the levels loaded in the internal registers via the serial bus host 1013 (see FIG. 10a) or any other suitable communications interface to the digital management core 1002. Such modification of the levels loaded in the internal registers can be performed remotely, via the serial bus host 1013, for example, by a battery charging system manufacturer after the battery charging system 1001 (see FIG. 10a) is in the hands of an end user. For example, such a battery charging system manufacturer can modify the levels loaded in the internal registers during a remote upgrade of system software over the serial bus host 1013. In this way, the charging voltage/current profiles defined by the specified voltage levels ($V_{n1}$, $V_{n2}$, $V_{n3}$, . . . $V_{nx}$) and the specified current levels ($I_{n1}$, $I_{n2}$, $I_{n3}$, . . . $I_{ny}$) can be easily modified based on specific charging characteristics of the battery cells 1005 employed in the battery pack 1003.

It will be appreciated by those of ordinary skill in the art that modifications to and variations of the above-described systems and methods may be made without departing from the inventive concepts disclosed herein. Accordingly, the invention should not be viewed as limited except as by the scope and spirit of the appended claims.

What is claimed is:

1. A system for charging battery power in a battery pack, the battery pack including one or more battery cells, the system comprising:
    a first voltage sense amplifier operative to sense a level of a battery pack voltage;
    at least one second voltage sense amplifier operative to sense at least one level of at least one battery cell voltage;
    a battery charging manager operative:
        to set a predetermined target voltage level for each of the battery pack voltage and the at least one battery cell voltage; and
        to select a battery voltage from among the battery pack voltage and the at least one battery cell voltage to control the charging of the battery power in the battery pack;
    a comparator operative to sense a level of the selected battery voltage, and to compare the level of the selected battery voltage with the predetermined target voltage level for the selected battery voltage, thereby producing a voltage error deviation signal; and
    a charging signal generator operative to monitor, in a feedback loop, the voltage error deviation signal produced by the comparator, to generate a charging signal using the voltage error deviation signal, and to apply the charging signal to the battery pack for minimizing the voltage error deviation signal during the charging of the battery power in the battery pack.

2. The system of claim 1 further comprising a power stage operative to receive the charging signal from the charging signal generator, and to generate a battery charging current using the charging signal.

3. The system of claim 2 further comprising a current sense amplifier operative to sense a level of the battery charging current.

4. The system of claim 3 wherein the battery charging manager is further operative to select the battery voltage from among of the battery pack voltage and the at least one battery cell voltage based at least on one or more of the level of the battery pack voltage, the at least one level of the at least one battery cell voltage, and the level of the battery charging current.

5. The system of claim 4 wherein the battery charging manager is further operative to set a predetermined target current level for the battery charging current.

6. The system of claim 5 wherein the charging signal generator is further operative to apply the charging signal to the battery pack for minimizing an error deviation in the level of the battery charging current from the predetermined target current level.

7. The system of claim 1 wherein the at least one battery cell voltage comprises a plurality of battery cell voltages, wherein the battery charging manager is further operative to determine a maximum battery voltage from among the plurality of battery cell voltages, and to select the maximum battery voltage as the selected battery voltage for controlling the charging of the battery power in the battery pack.

8. A method of charging battery power in a battery pack that includes one or more battery cells, comprising:
    monitoring a level of a battery pack voltage;
    monitoring at least one level of at least one battery cell voltage;
    setting a predetermined target voltage level for each of the battery pack voltage and the at least one battery cell voltage;
    selecting a battery voltage from among the battery pack voltage and the at least one battery cell voltage to control the charging of the battery power in the battery pack;
    sensing a level of the selected battery voltage;
    comparing the level of the selected battery voltage with the predetermined target voltage level for the selected battery voltage, thereby producing a voltage error deviation signal;
    monitoring the voltage error deviation signal in a feedback loop;
    generating a charging signal for charging the battery power in the battery pack using the voltage error deviation signal; and
    applying the charging signal to the battery pack for minimizing the voltage error deviation signal during the charging of the battery power in the battery pack.

9. The method of claim 8 further comprising generating a battery charging current using the charging signal.

10. The method of claim 9 further comprising monitoring a level of the battery charging current, and wherein the selecting of the battery voltage from among the battery pack voltage and the at least one battery cell voltage includes selecting the battery voltage from among the battery pack voltage and the at least one battery cell voltage based at least on one or more of the level of the battery pack voltage, the at least one level of the at least one battery cell voltage, and the level of the battery charging current.

11. The method of claim 9 further comprising setting a predetermined target current level for the battery charging current, and wherein the applying of the charging signal includes applying the charging signal to the battery pack for minimizing an error deviation in the level of the battery charging current from the predetermined target current level.

12. The method of claim 8 wherein the at least one battery cell voltage comprises a plurality of battery cell voltages, and wherein the method further comprises:
    determining a maximum battery voltage from among the plurality of battery cell voltages,
    wherein the selecting of the battery voltage from among the battery pack voltage and the at least one battery cell voltage includes selecting the maximum battery voltage as the selected battery voltage for controlling the charging of the battery power in the battery pack.

13. A method of charging battery power in a battery pack that includes one or more battery cells, comprising:
    monitoring a level of a battery pack voltage;
    monitoring at least one level of at least one battery cell voltage;
    setting predetermined target voltage levels for the battery pack voltage and the at least one battery cell voltage;
    selecting at least one of the battery pack voltage and the at least one battery cell voltage to control the charging of the battery power in the battery pack;
    generating a charging signal for minimizing error deviations in the levels of the selected one or more of the battery pack voltage and the at least one battery cell voltage from the respective predetermined target voltage levels;
    generating a battery charging current at a corresponding battery charging voltage using the charging signal;
    performing current-controlled charging of the battery pack, including:

monitoring a plurality of increasing voltage levels of a battery charging voltage; and at each of the plurality of increasing voltage levels of the battery charging voltage, reducing the battery charging current by a predetermined amount until the battery charging voltage reaches a specified voltage saturation level greater than a specified battery float voltage level; and performing voltage-controlled charging of the battery pack, including:

monitoring further reduction in the battery charging current to less than a specified current saturation level; and while the battery charging current is less than the specified current saturation level but greater than a specified current cutoff level, reducing the battery charging voltage from the specified voltage saturation level to the specified battery float voltage level.

14. The method of claim 13 further comprising, in the event the battery charging current is less than the specified current cutoff level, terminating the charging of the battery power in the battery pack.

15. The method of claim 13 wherein the generating of the charging signal includes generating a pulse width modulation (PWM) signal, and wherein the method further comprises controlling, by the PWM signal, gate drive circuitry for providing the battery charging current.

\* \* \* \* \*